US012680681B2

(12) United States Patent
Koebl et al.

(10) Patent No.: US 12,680,681 B2
(45) Date of Patent: Jul. 14, 2026

(54) WORK LIGHT

(71) Applicant: MILWAUKEE ELECTRIC TOOL CORPORATION, Brookfield, WI (US)

(72) Inventors: John F. Koebl, Menomonee Falls, WI (US); Christina Y. Prestidge-Kadrlik, Pewaukee, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 0 days.

(21) Appl. No.: 19/179,462

(22) Filed: Apr. 15, 2025

(65) Prior Publication Data

US 2025/0251116 A1 Aug. 7, 2025

Related U.S. Application Data

(63) Continuation of application No. 18/736,678, filed on Jun. 7, 2024, now Pat. No. 12,297,987.

(60) Provisional application No. 63/471,525, filed on Jun. 7, 2023.

(51) Int. Cl.

*F21V 21/096* (2006.01)
*F21S 9/02* (2006.01)
*F21V 21/14* (2006.01)
*F21V 21/26* (2006.01)

(52) U.S. Cl.

CPC ............ *F21V 21/0965* (2013.01); *F21S 9/02* (2013.01); *F21V 21/145* (2013.01); *F21V 21/26* (2013.01)

(58) Field of Classification Search

CPC .... F21V 21/0965; F21V 21/145; F21V 21/26; F21S 9/02

USPC .......................................................... 362/398

See application file for complete search history.

(56) References Cited

U.S. PATENT DOCUMENTS

| | | | | |
|---|---|---|---|---|
| 4,595,970 | A | 6/1986 | Diffrient | |
| 7,246,927 | B2 | 7/2007 | Wikle et al. | |
| 8,002,432 | B2 | 8/2011 | Chen et al. | |
| 8,408,761 | B2 * | 4/2013 | Ng | H01R 35/04 362/418 |
| D715,300 | S | 10/2014 | Shen | |
| 9,719,641 | B1 * | 8/2017 | Volek | F21V 23/02 |
| D818,516 | S | 5/2018 | Yamakose et al. | |

(Continued)

FOREIGN PATENT DOCUMENTS

| | | |
|---|---|---|
| CN | 205079074 U | 3/2016 |
| CN | 108150875 A | 6/2018 |

(Continued)

*Primary Examiner* — Laura K Tso

(74) *Attorney, Agent, or Firm* — Michael Best & Friedrich LLP

(57) ABSTRACT

A work light includes a base configured to receive a battery, an arm including a first arm segment attached to the base and a second arm segment attached to the first arm segment, and an arm hinge disposed between the first arm segment and the second arm segment. The arm hinge includes a first head joint coupled to the first arm segment, a second head joint coupled to the second arm segment, and a center joint located between the first and second head joints. Each of the first head joint, the second head joint, and the center joint is hollow. The work light also includes a light fixture attached to an end of the second arm segment opposite the first arm segment. The light fixture is connected to the battery by wiring that extends from the base to the light fixture through the arm hinge.

20 Claims, 32 Drawing Sheets

(56) References Cited

U.S. PATENT DOCUMENTS

| | | | |
|---|---|---|---|
| D892,192 | S | 8/2020 | Furusawa et al. |
| D896,425 | S | 9/2020 | Saboo |
| D956,296 | S | 6/2022 | Cacciabeve |
| 11,454,358 | B2 * | 9/2022 | Qiu ..................... F21V 21/0885 |
| 11,454,380 | B2 * | 9/2022 | Zhou ................... F21V 23/0485 |
| D1,030,848 | S | 6/2024 | Wu |
| D1,032,036 | S | 6/2024 | Cooper et al. |
| 12,297,987 | B2 * | 5/2025 | Koebl ..................... F21V 21/30 |
| D1,097,263 | S | 10/2025 | Wu |
| 2011/0141737 | A1 | 6/2011 | Gu et al. |
| 2013/0335996 | A1 | 12/2013 | Yao et al. |
| 2018/0340661 | A1 | 11/2018 | Inskeep |
| 2022/0090768 | A1 | 3/2022 | Westling et al. |

FOREIGN PATENT DOCUMENTS

| | | | |
|---|---|---|---|
| CN | 208222163 | U | 12/2018 |
| CN | 208566280 | U | 3/2019 |
| CN | 209130676 | U | 7/2019 |
| CN | 210035320 | U | 2/2020 |
| CN | 211372015 | U | 8/2020 |
| CN | 211780375 | U | 10/2020 |
| CN | 212178815 | U | 12/2020 |
| CN | 213395005 | U | 6/2021 |
| CN | 213629962 | U | 7/2021 |
| CN | 213630150 | U | 7/2021 |
| CN | 214038131 | U | 8/2021 |
| CN | 113639235 | A | 11/2021 |
| CN | 215722112 | U | 2/2022 |
| CN | 216079160 | U | 3/2022 |
| CN | 216619597 | U | 5/2022 |
| CN | 114704790 | A | 7/2022 |
| DE | 2643780 | A1 | 3/1978 |

* cited by examiner

WORK LIGHT

CROSS-REFERENCE TO RELATED APPLICATION

This application is a continuation of U.S. patent application Ser. No. 18/736,678, filed Jun. 7, 2024, now U.S. Pat. No. 12,297,987, which claims priority to U.S. Provisional Application No. 63/471,525, filed Jun. 7, 2023, the entire contents of both of which are incorporated by reference herein.

FIELD OF INVENTION

The present disclosure relates to work lights, and more specifically, to work lights configured to be attached to a work surface through magnetism.

SUMMARY

In one aspect, the disclosure provides a work light including a base, an arm, a light fixture, and a manual release assist mechanism. The base includes a plurality of magnets that is configured to create a magnetic connection between the base and the work surface to secure the base to the work surface. The arm is attached to the base and is configured to pivot relative to the base. The light fixture is coupled to the arm at an end of the arm opposite from the base. The manual release assist mechanism is provided on the base. The manual release assist mechanism is engageable with the work surface to reduce the strength of the magnetic connection between the base and the work surface.

In another aspect, the disclosure provides a work light including a base, an arm, an arm hinge, and a light fixture. The arm includes a first arm segment attached to the base and a second arm segment attached to the first arm segment. The arm is adjustable between a collapsed state and an extended state. The arm hinge is disposed between the first arm segment and the second arm segment at an end of the first arm segment opposite from the base. The arm hinge enables the second arm segment to pivot relative to the first arm segment about a first hinge axis and a second hinge axis to adjust the arm between the collapsed state and the extended state. The light fixture is attached to an end of the second arm segment opposite the first arm segment.

In another aspect, the disclosure provides a work light including a base, an arm, and a light fixture. The base includes a plurality of magnets, a handle at a first end of the base, and a battery receptacle at a second end of the base. The plurality of magnets is provided at a first surface of the base. The plurality of magnets is configured to create a magnetic connection between the base and a work surface to secure the base to the work surface. The battery receptacle is configured to receive a battery. The arm is attached to a second surface of the base opposite from the first surface and is configured to pivot relative to the base. The light fixture is attached to the arm and is configured to pivot relative to the arm. The light fixture is configured to receive power from the battery attached to the battery receptacle.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1A:
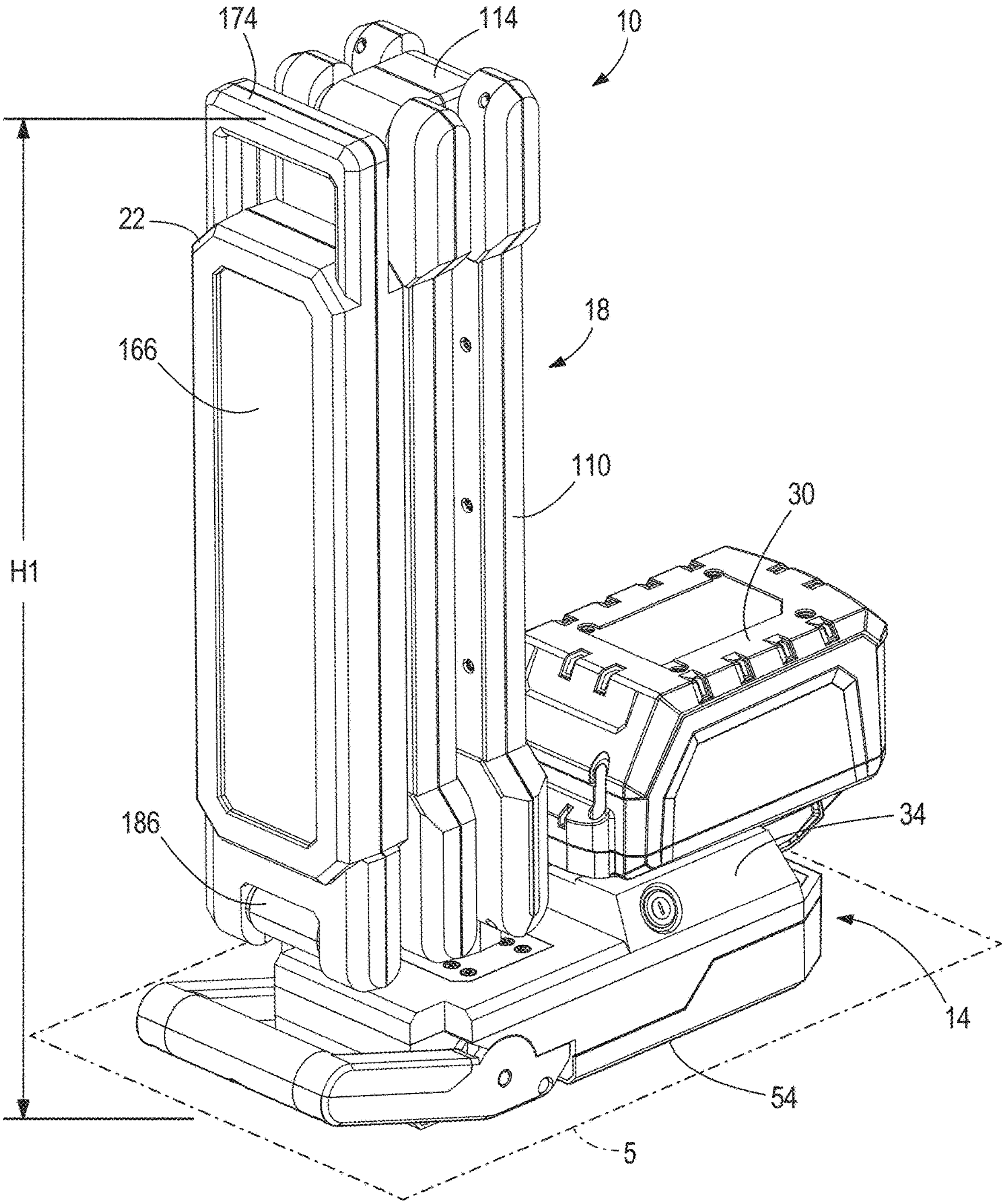
FIG. 1A is a perspective view of a work light in a first collapsed state and including a base, an arm, a light fixture, and a manual release assist mechanism according to an embodiment of the disclosure.
Figure 1B:
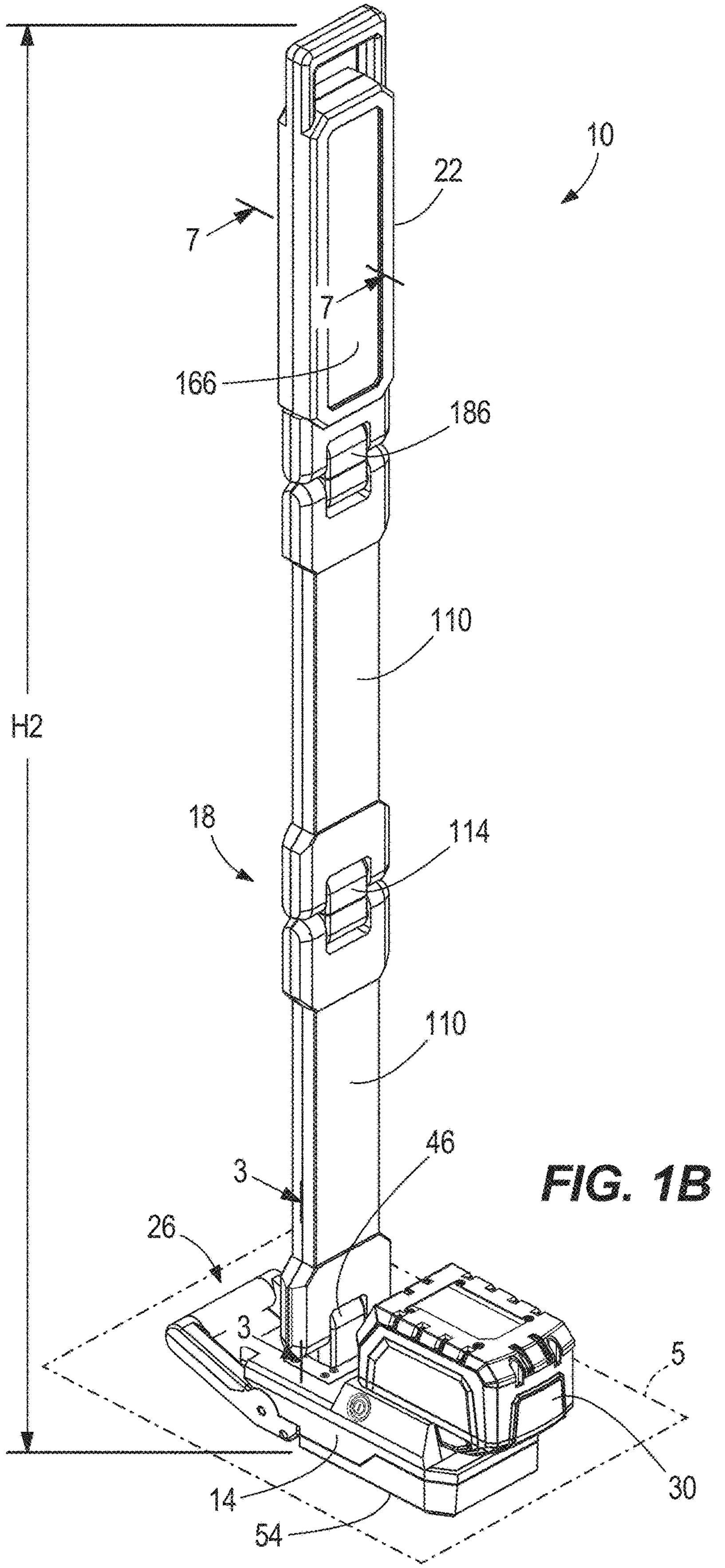
FIG. 1B is a perspective view of the work light in an extended state.

FIGS. 1A and 1B illustrate a work light 10. The work light 10 may also be referred to as a boom light. The boom light 10 is configured to be located on or adjacent to a work surface 5 to provide illumination for a work area. The boom light 10 is adjustable to provide illumination on the work area at different angles and from different heights.

As illustrated in FIGS. 1A and 1B, the boom light 10 includes a base 14, an articulating arm 18, a light fixture 22, and a manual release assist mechanism 26. The base 14 is configured to be positioned on or attached to the work surface 5. In the illustrated embodiment, the base 14 is attachable to the work surface 5 through magnetism. In other embodiments, the base 14 may be attachable to the work surface 5 through other means, such as suction or adhesives. In still other embodiments, the base 14 may be attachable to the work surface through a clamp, clips, or other types of fasteners. A battery 30 is removably attached to the base 14 for providing power to the light fixture 22. The arm 18 is attached to the base 14 at an upper surface of the base 14 between the manual release assist mechanism 26 and the battery 30. The arm 18 extends from the base 14 and is attached to the light fixture 22 at an end of the arm 18 opposite from the base 14. The arm 18 is adjustable between a collapsed state (FIG. 1A) and an extended state (FIG. 1B). The manual release assist mechanism 26 is coupled to the base 14. The manual release assist mechanism 26 is configured to assist removal of the base 14 from the work surface 5.

Figure 1C:
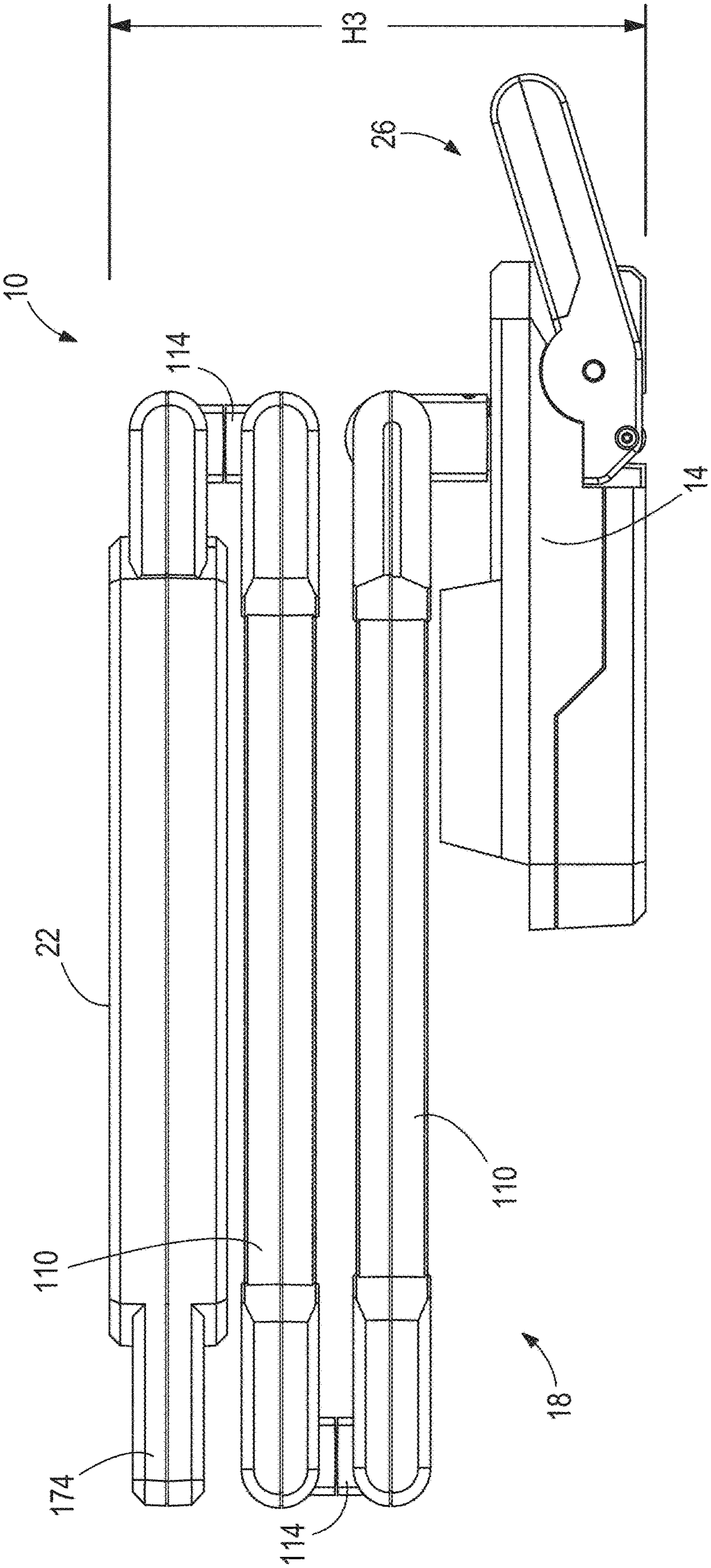
FIG. 1C is a plan view of the work light in a second collapsed state.
Figure 1D:
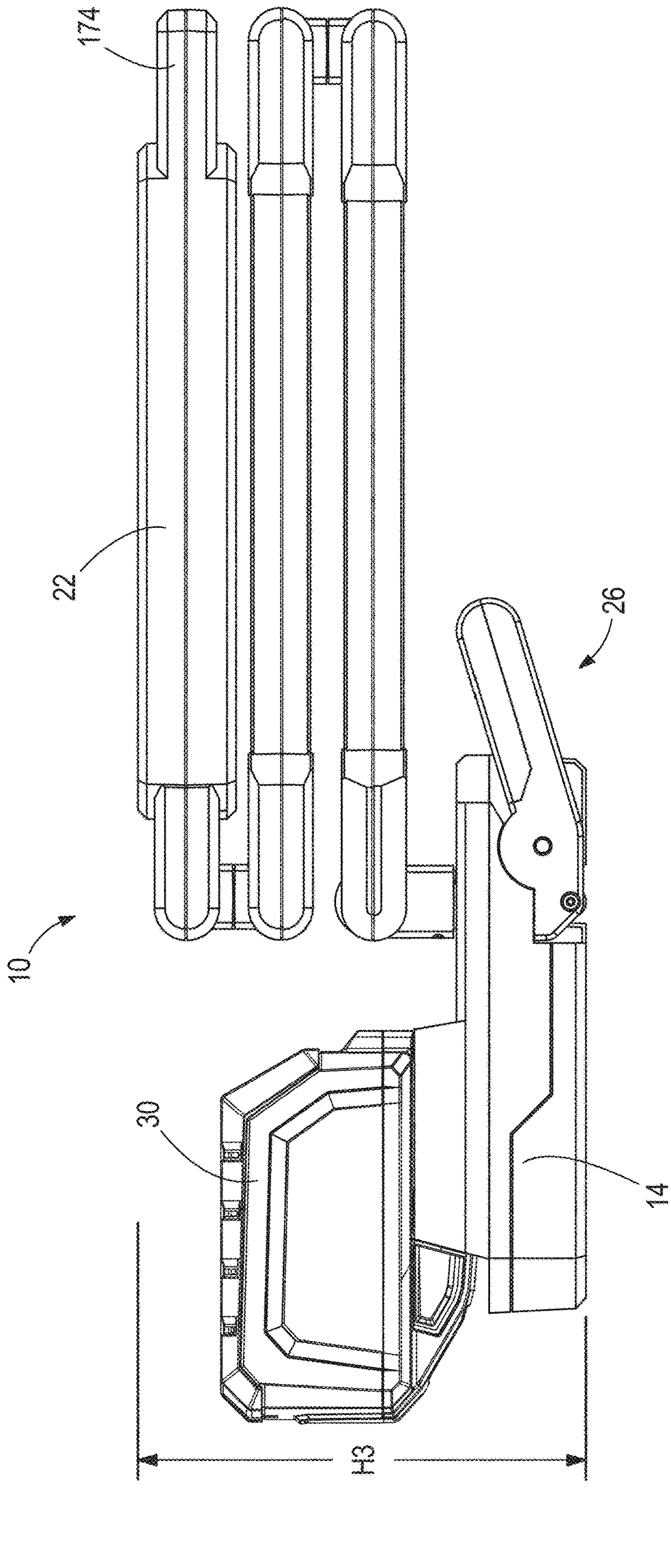
FIG. 1D is a plan view of the work light in a third collapsed state.

As illustrated in FIGS. 1A, 1C, and 1D, the arm 18 may be oriented in a first collapsed state (FIG. 1A), a second collapsed state (FIG. 1C), and a third collapsed state (FIG. 1D). In each of the collapsed states, arm segments 110 of the arm 18 extend parallel to and offset from each other. Additionally, in each of the collapsed states, the light fixture 22 extends parallel to and offset from each of the arm segments 110. In other words, each arm segment 110 and the light fixture defines a longitudinal axis extending along its length. The longitudinal axes are generally parallel to each other when in the collapsed states. In the illustrated embodiment, the arm segments 110 and the light fixture 22 overlap each other when in the collapsed states. That is, the arm segments 110 and the light fixture 22 fold relative to each other. In addition, the arm segments 110 and the light fixture 22 are all generally the same size. For example, each of the arm segments 110 and the light fixture 22 has a similar length. Each of the arm segments 110 and the light fixture 22 also has a similar width. Each of the arm segments 110 and the light fixture 22 also has a similar thickness. When in the collapsed states, the arm segments 110 and the light fixture 22 stack on top of or adjacent each other such that the overall assembly has generally the same length and the same width as one of the arm segments 110.

With reference to FIG. 1A, the first collapsed state may also be referred to as an upright collapsed state in which the light fixture 22 extends substantially perpendicular to the base 14. With reference to FIG. 1C, the second collapsed state may also be referred to as a battery-side collapsed state in which the light fixture 22 extends parallel to the base 14 and toward a side of the base 14 that receives the battery 30. The arm 18 may only be configurable in the second collapsed state when the battery 30 is not attached to the base 14. With reference to FIG. 1D, the third collapsed state may also be referred to as an assist mechanism-side collapsed state in which the light fixture 22 extends parallel to the base 14 and toward a side of the base 14 that receives, or includes, the manual release assist mechanism 26. As such, the arm 18 enables the boom light 10 to be adaptable to user-preference for, among other things, storing, packing, and transporting the boom light 10. As described in more detail below, the arm 18 is rotatable relative to the base 14 such that the arm 18 may be oriented in other collapsed states than illustrated in FIGS. 1A, 1B, and 1C.

With reference to FIGS. 1A-1D, the boom light 10 has different heights in each of the first collapsed state (FIG. 1A), the extended state (FIG. 1B), the second collapsed state (FIG. 1C), and the third collapsed state (FIG. 1D). Further, the different heights of the boom light 10 may be measured between different points of the boom light 10. With reference to FIGS. 1A and 1B, a height H1, H2 of the boom light 10 in both the first collapsed state and the extended state is measured from a bottom of the base 14 to an end of the light fixture 22 opposite from the base 14. With reference to FIGS. 1C and 1D, a height H3 of the boom light 10 in both the second collapsed state and the third collapsed state is measured from a bottom of the base 14 to a top face of the light fixture 22 (e.g., a face of the light fixture 22 directed away from the base 14). When the arm 18 is in the first collapsed state (FIG. 1A), the boom light 10 has a first height H1 that is roughly 15 inches. In some embodiments, the first height H1 may be between 5 and 25 inches. When the arm 18 is in the second collapsed state (FIG. 1C) and the third collapsed state (FIG. 1D), the boom light 10 has a third height H3 that is roughly 7 inches. In other embodiments, the boom light 10 may have a different height in each of the second collapsed state (FIG. 1C) and the third collapsed state (FIG. 1D). For example, the third height H3 may be between 5 and 10 inches. When the arm 18 is in the extended state (FIG. 1B), the boom light 10 has a second height H2 that is roughly 45 inches. Therefore, the boom light 10 in the extended state (FIG. 1B) is roughly 3 times taller than the boom light 10 in the first collapsed state (FIG. 1A), and roughly 6.5 times taller than the boom light 10 in the second collapsed state (FIG. 1C) and the third collapsed state (FIG. 1D). In some embodiments, the second height H2 may be between 30 and 60 inches. The boom light 10 in the extended state (FIG. 1B) may be at most 5 times taller than the boom light 10 in the first collapsed state (FIG. 1A), and at most 10 times taller than the boom light 10 in the second collapsed state (FIG. 1C) and the third collapsed state (FIG. 1D). Further, the boom light 10 in the first collapsed state (FIG. 1A) is roughly twice the height of the boom light 10 in both the second collapsed state (FIG. 1C) and the third collapsed state (FIG. 1D). The boom light 10 in the first collapsed state (FIG. 1A) may be four times taller than the boom light 10 in the second collapsed state (FIG. 1C) and the third collapsed state (FIG. 1D).

Figure 10A:
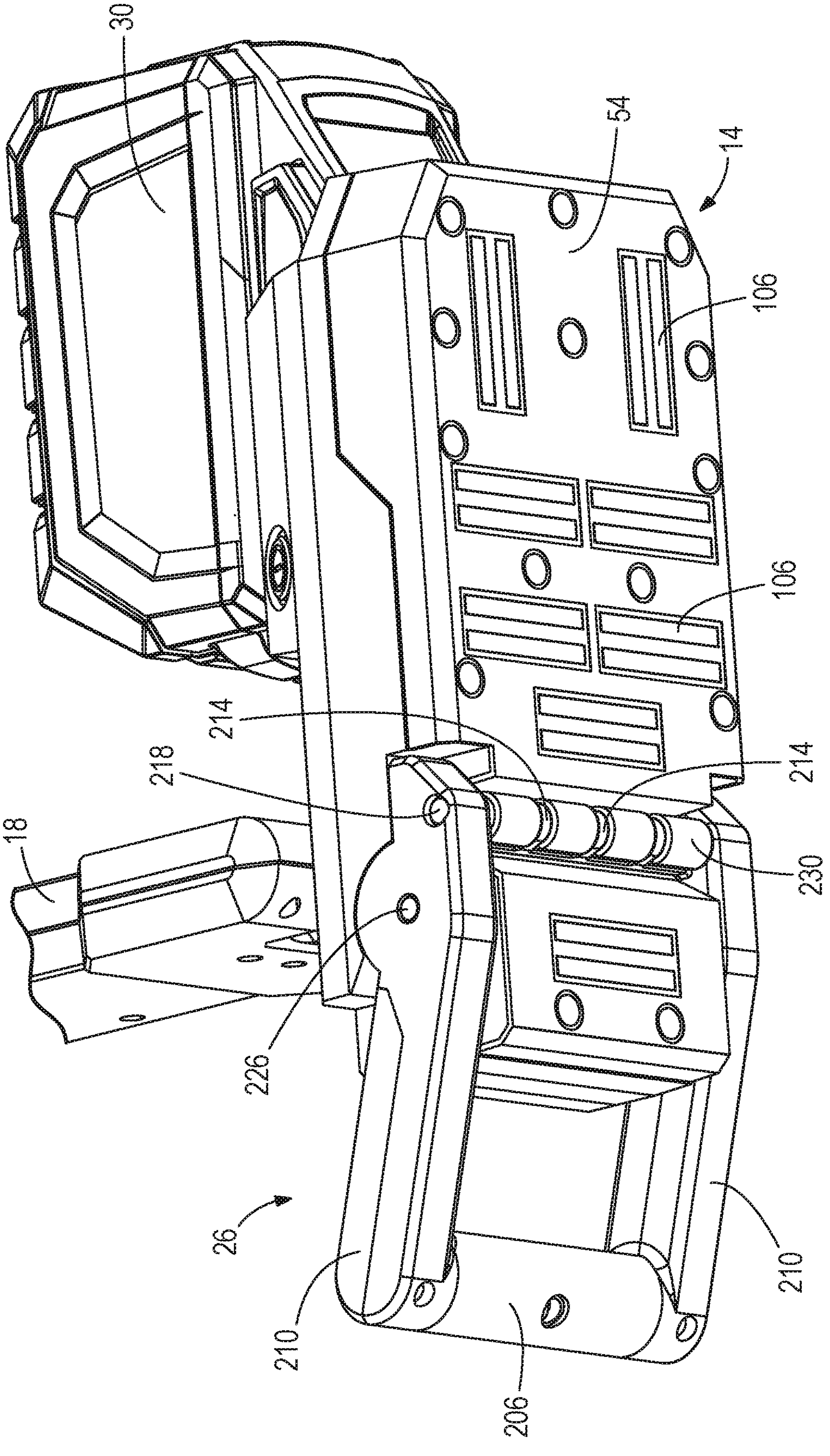
FIG. 10A is a bottom perspective view of the base and a manual release assist mechanism.
Figure 10B:
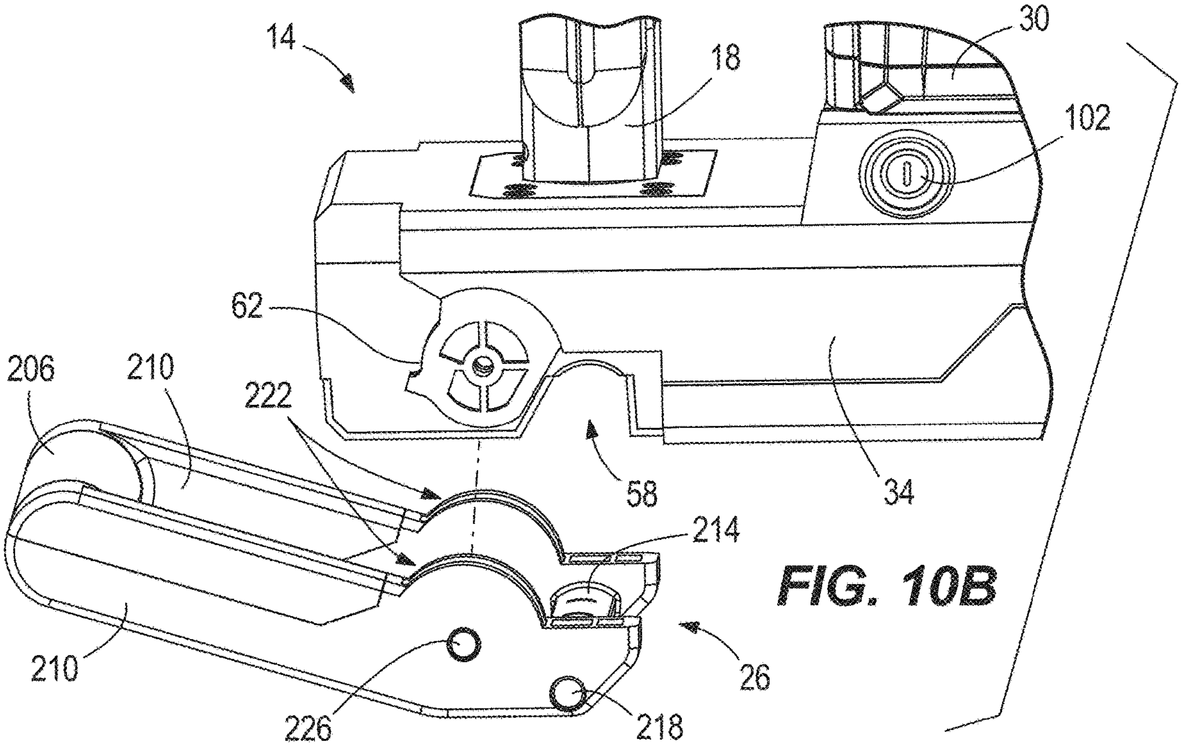
FIG. 10B is a perspective view of the manual release assist mechanism exploded from the base.
Figure 10C:
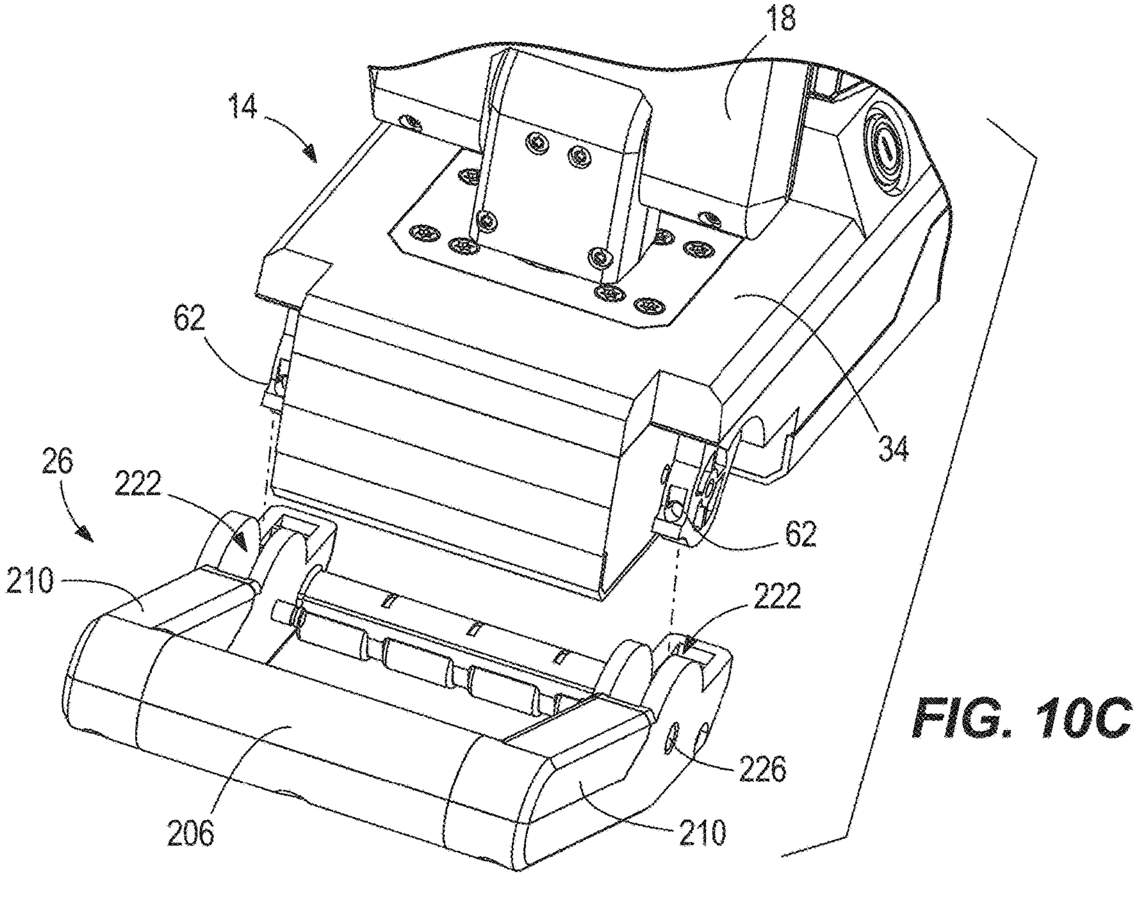
FIG. 10C is another perspective view of the manual release assist mechanism exploded from the base.
Figure 10D:
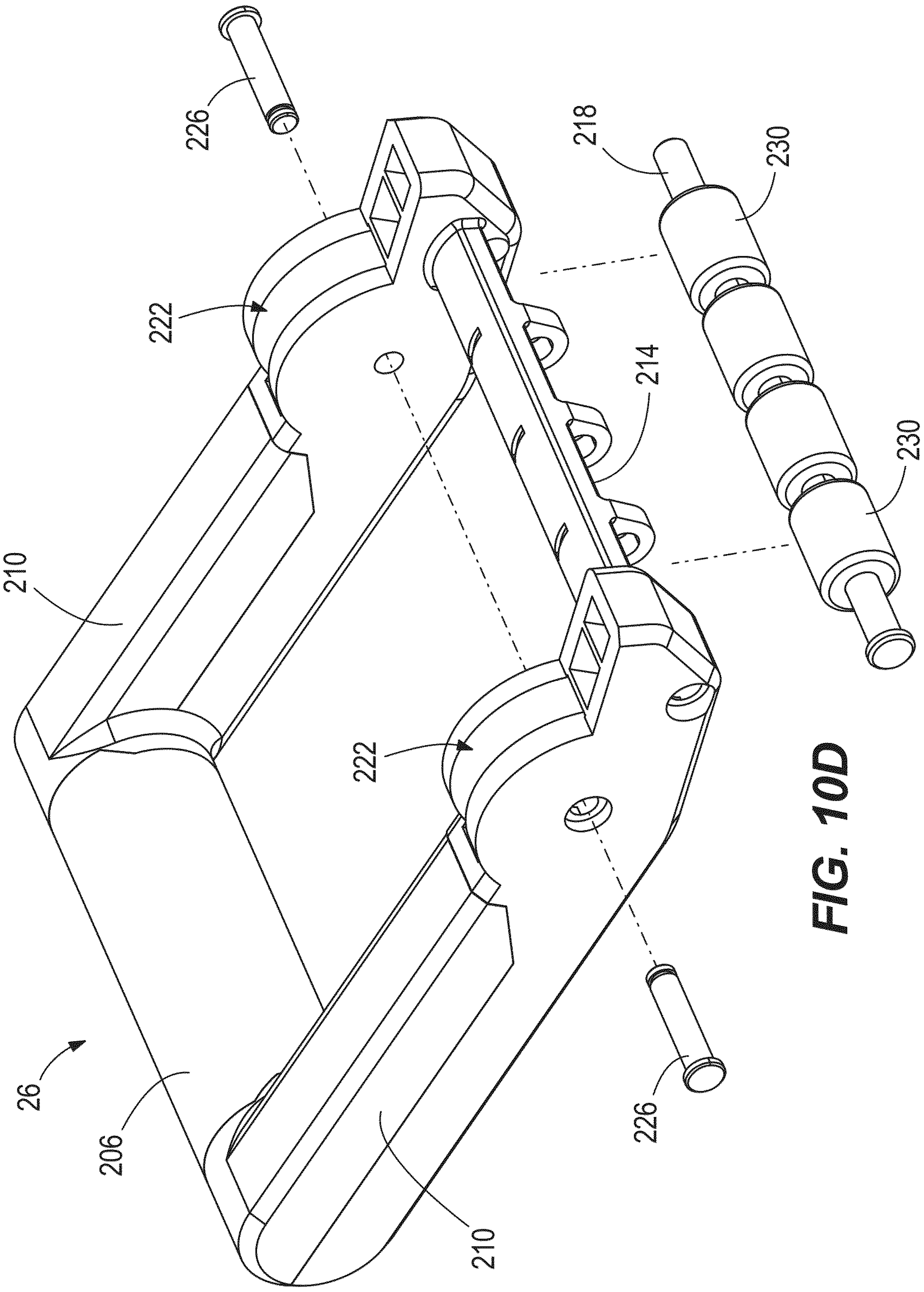
FIG. 10D is an exploded view of the manual release assist mechanism.

With reference to FIGS. 2A-4, the base 14 includes a housing 34 defining a cavity 38, an arm receptacle 42 that receives a base hinge 46, and a battery receptacle 50 that receives the battery 30. The housing 34 includes a magnetic surface 54 located on a side of the housing 34 opposite from the arm receptacle 42 and the battery receptacle 50. As such, the cavity 38 is at least partially defined between a side of the housing 34 including the arm receptacle 42 and the battery receptacle 50 and a side of the housing 34 including the magnetic surface 54. The magnetic surface 54 is configured to magnetically attach to the work surface 5 (FIG. 1) to secure the base 14 to the work surface 5 (FIG. 1). The magnetic surface 54 may also be referred to as a first surface or a lower surface. An inlet 58 is defined in the magnetic surface 54 and receives a portion of the manual release assist mechanism 26. The housing 34 additionally includes a pair of coupling tabs 62 (FIGS. 10B and 10C) that are coupled to the manual release assist mechanism 26. In some embodiments, the manual release assist mechanism 26 may be formed integrally with the base 14 such that the housing 34 does not include the coupling tabs 62.

Figure 2A:
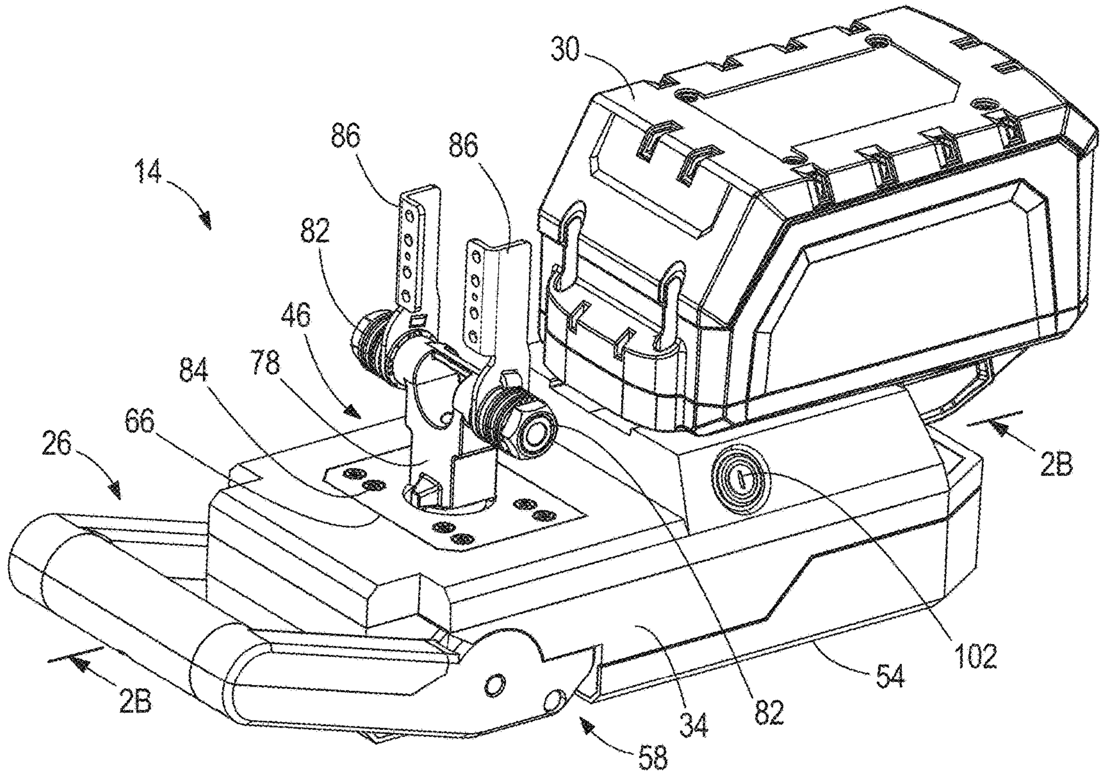
FIG. 2A is a perspective view of the base.
Figure 2B:
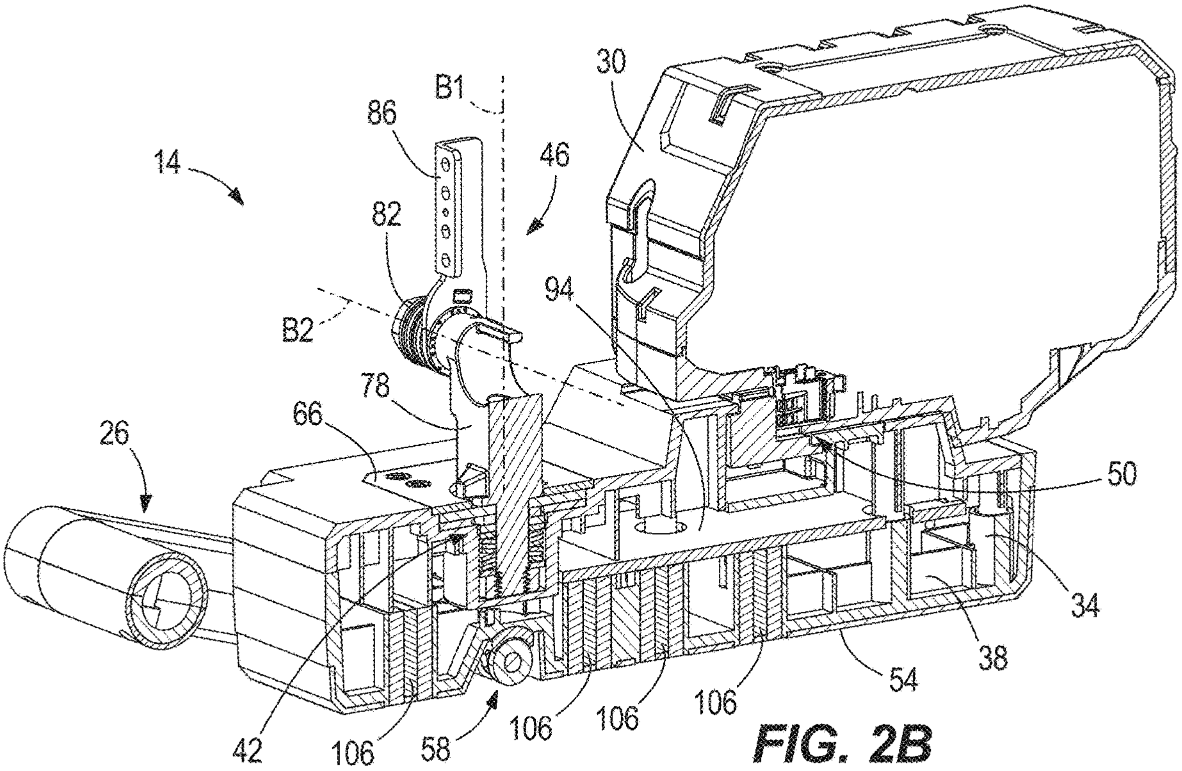
FIG. 2B is a cross-sectional view of the base taken along line 2B-2B in FIG. 2A.
Figure 2C:
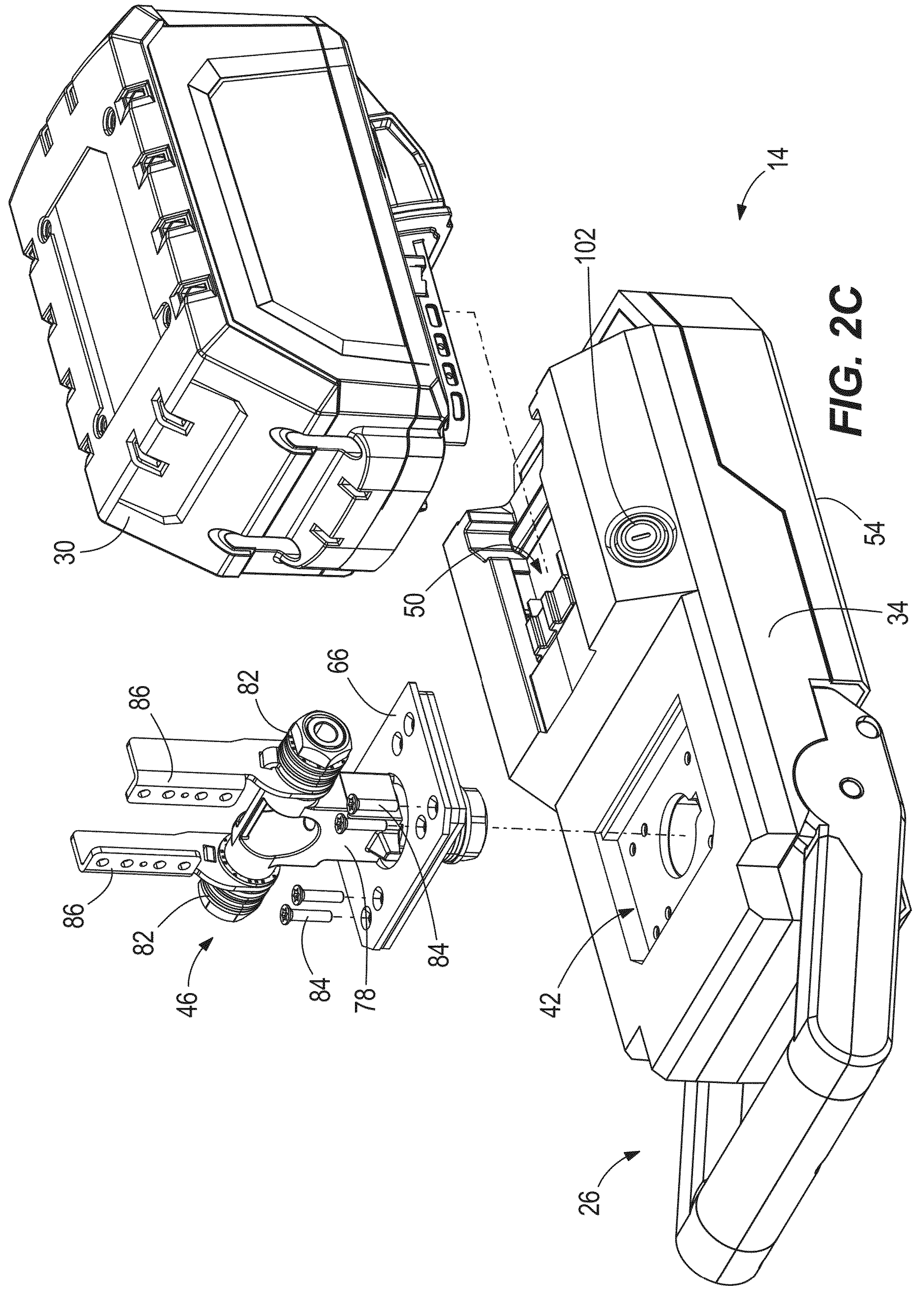
FIG. 2C is an exploded view of the base illustrated in FIG. 2A.
Figure 3:
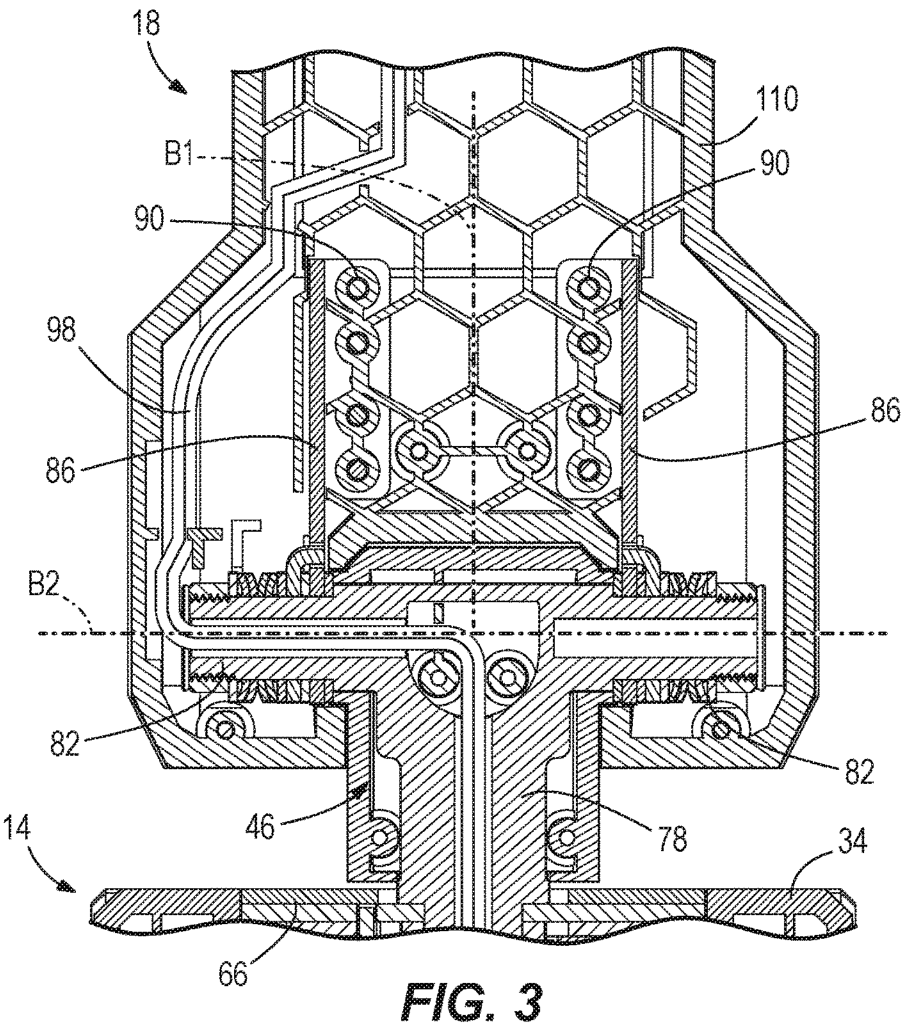
FIG. 3 is a cross-sectional view of portions of the base and the arm taken along line 3-3 in FIG. 1B.

As illustrated in FIGS. 2A-3, the base hinge 46 includes a plate portion 66, a center shaft 78, and two head joints 82. The plate portion 66 rests in the arm receptacle 42 and receives a plurality of fasteners 84 to secure the base hinge 46 to the base 14. The center shaft 78 extends from the plate portion 66. The center shaft 78 defines a first base hinge axis B1. The head joints 82 are positioned at an end of the center shaft 78 opposite from the plate portion 66. The head joints 82 include brackets 86 that receive fasteners 90 to couple the arm 18 to the base hinge 46. The head joints 82 define a second base hinge axis B2. The second base hinge axis B2 extends perpendicularly to the first base hinge axis B1. The arm 18 is configured to rotate relative to the base 14 independently about the first base hinge axis B1 and about the second base hinge axis B2.

With reference to FIGS. 2B-3, when the battery 30 is received in the battery receptacle 50, the battery 30 is configured to electrically connect to a printed circuit board assembly 94 (i.e., a PCBA). The PCBA 94 is electrically connected to wiring 98 (e.g., best illustrated in FIG. 6B) that extends through the arm 18 to the light fixture 22 such that an electrical connection is formed between the light fixture 22 and the battery 30 through the PCBA 94. Returning reference to FIGS. 2A and 3, an actuator or power switch 102 is supported by the housing 34 adjacent to the battery receptacle 50. The actuator 102 is electrically connected to the PCBA 94 and is actuatable, or pressable, to turn on and off a supply of power to the light fixture 22 (FIG. 1) from the battery 30.

Figure 4:
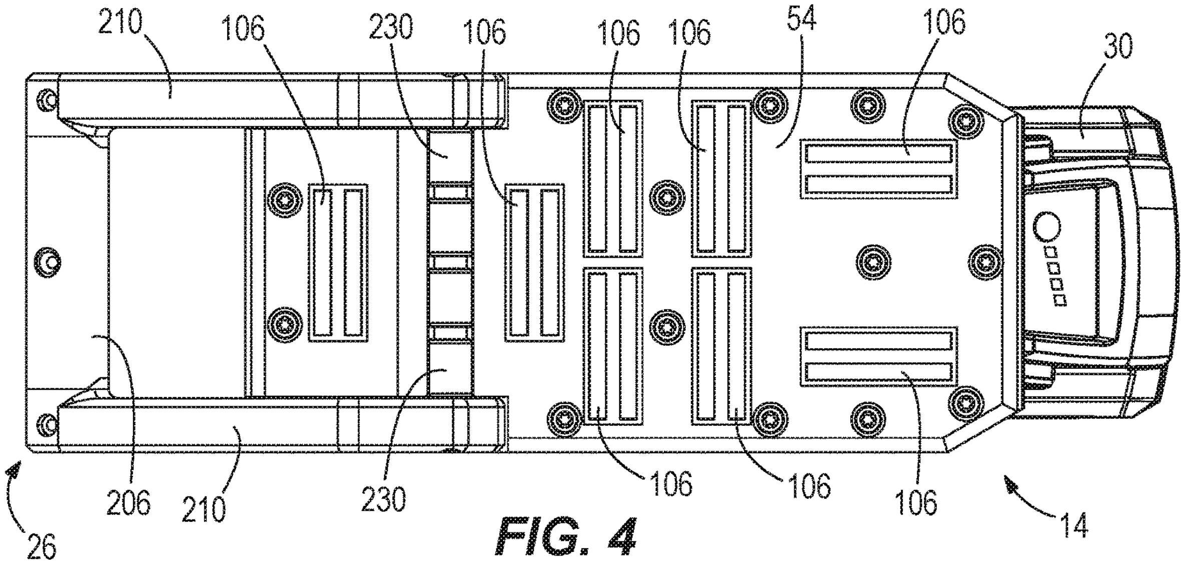
FIG. 4 is a bottom view of the base.

As illustrated in FIGS. 2B and 4, the base 14 further includes a plurality of magnets 106 disposed in the housing 34. Each of the magnets 106 extends from within the cavity 38 and through the magnetic surface 54 such that at least a portion of each of the magnets 106 is exposed from the magnetic surface 54. As such, the plurality of magnets 106 creates a magnetic field for the magnetic surface 54, thereby enabling the magnetic surface 54 to secure the base 14 to the work surface 5 (FIG. 1A) via a magnetic connection with the work surface 5 (FIG. 1A). In the illustrated embodiment, the magnets 106 are permanent block magnets. In other embodiment, the magnets 106 may be formed in a different shape or be a different type of magnet. In the illustrated embodiment, the base 14 includes eight magnets 106. In other embodiments, the base 14 may include more or fewer magnets 106. For example, the base 14 may include between one and ten or more magnets. Varying the number of magnets 106 may vary the strength of the magnetic connection between the base 14 and the work surface 5.

Returning reference to FIG. 1B, the arm 18 includes two arm segments 110 and an arm hinge 114 disposed between the two arm segments 110 to enable rotation of the arm segments 110 relative to each other. Although only two arm segments 110 and one arm hinge 114 are illustrated in FIG. 1B, in some embodiments, the arm 18 may include additional arm segments 110 and arm hinges 114. In other embodiments, the arm 18 may include just one arm segment 110 and no arm hinges 114. In further embodiments, the arm segments 110 may be removably couplable to the arm hinges 114 such that the length of the arm 18 is adjustable by adding or removing arm segments 110 from the arm 18.

Figure 5:
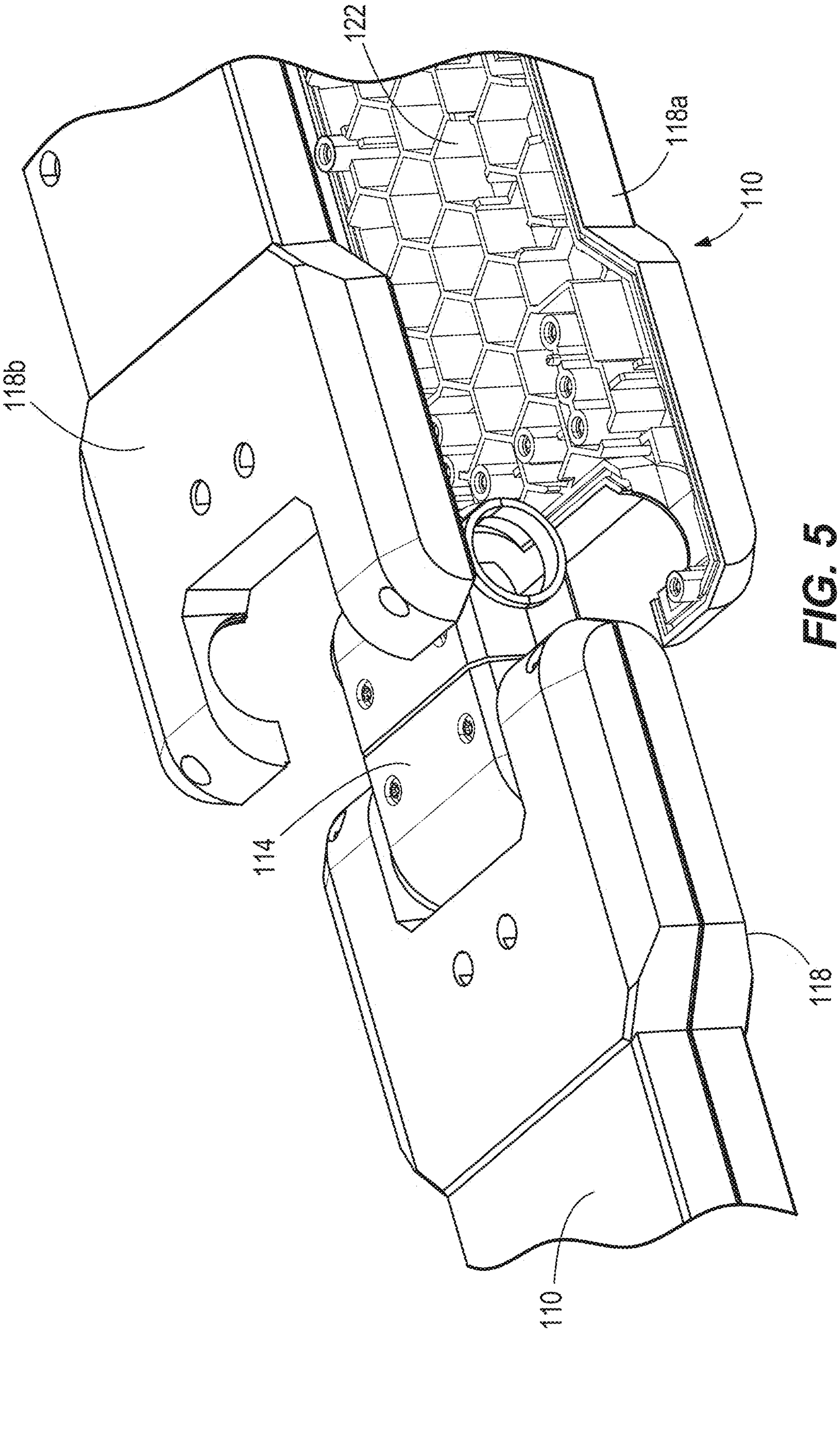
FIG. 5 is an exploded, perspective view of a portion of the arm including arm segments and an arm hinge.

With reference to FIGS. 1B and 5, each of the arm segments 110 includes a dog-bone shaped segment casing 118. The segment casing 118 is formed of two clamshell halves 118*a*, 118*b* that are coupled together by removable fasteners. As such, the clamshell halves 118*a*, 118*b* are removably coupled to each other and may be separated by removing the fasteners. The clamshell halves 118*a*, 118*b* may be separated to remove or couple an arm segment 110 to an arm hinge 114, thereby enabling adjustment of the length of the arm 18. The segment casing 118 additionally includes hexagonal support structures 122 extending between the clamshell halves 118*a*, 118*b* to strengthen the segment casing 118, and therefore, strengthen the arm segments 110. The support structures 122 define a path along the arm segments 110 for the wiring 98 (FIG. 3) to extend through the arm segments 110 to reach the light fixture 22.

Figure 6B:
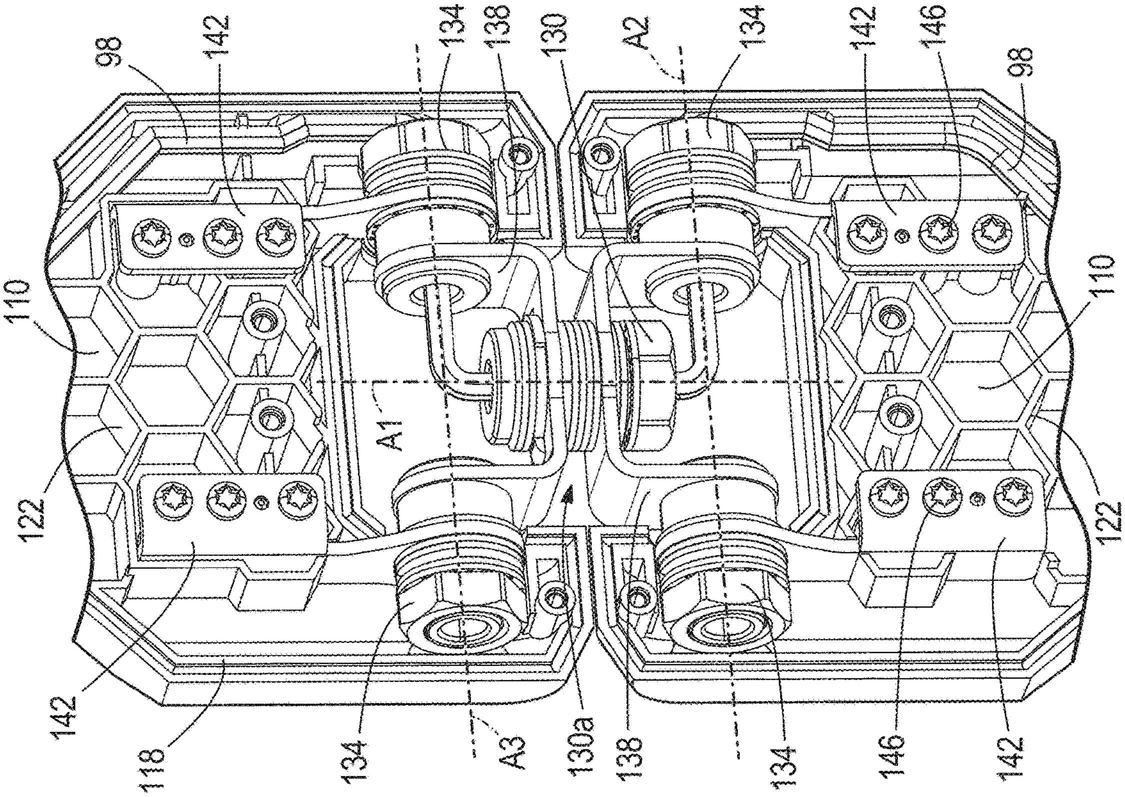
FIG. 6B is a perspective view of the portions of the arm segments and the arm hinge illustrated in FIG. 6A with a portion of each of the arm segments and the arm hinge removed.
Figure 6A:
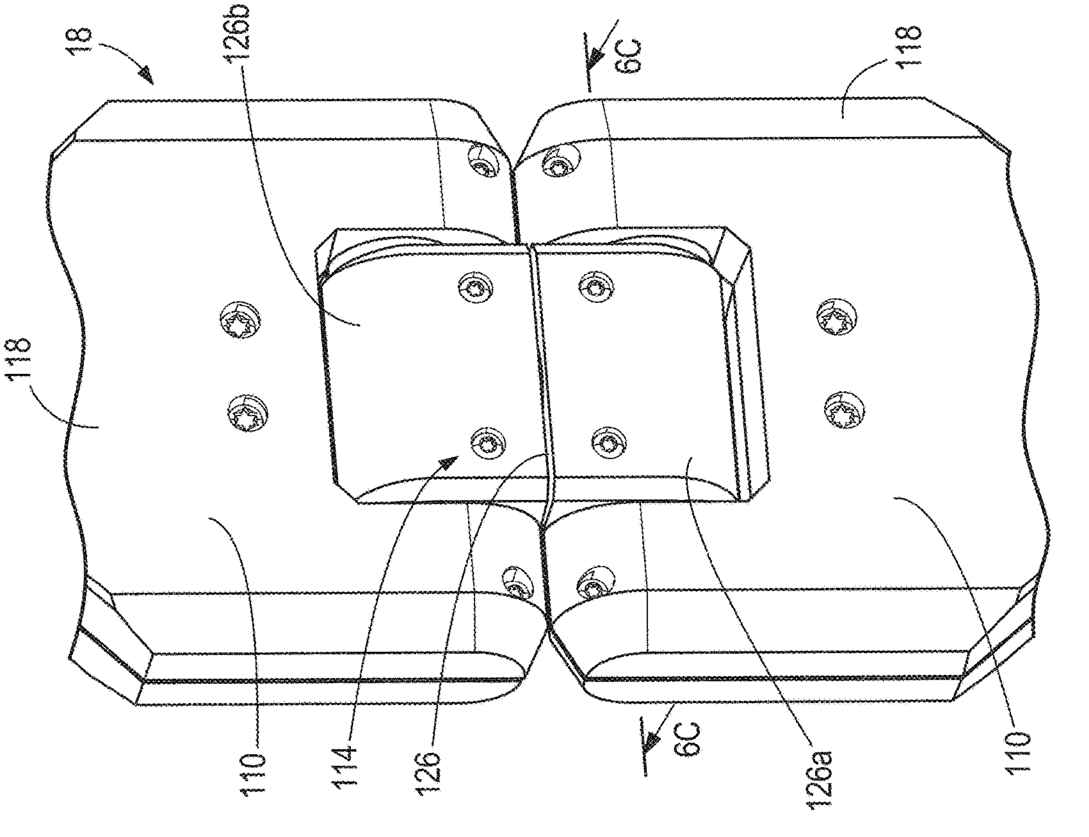
FIG. 6A is an enlarged view of portions of the arm segments and the arm hinge.
Figure 6C:
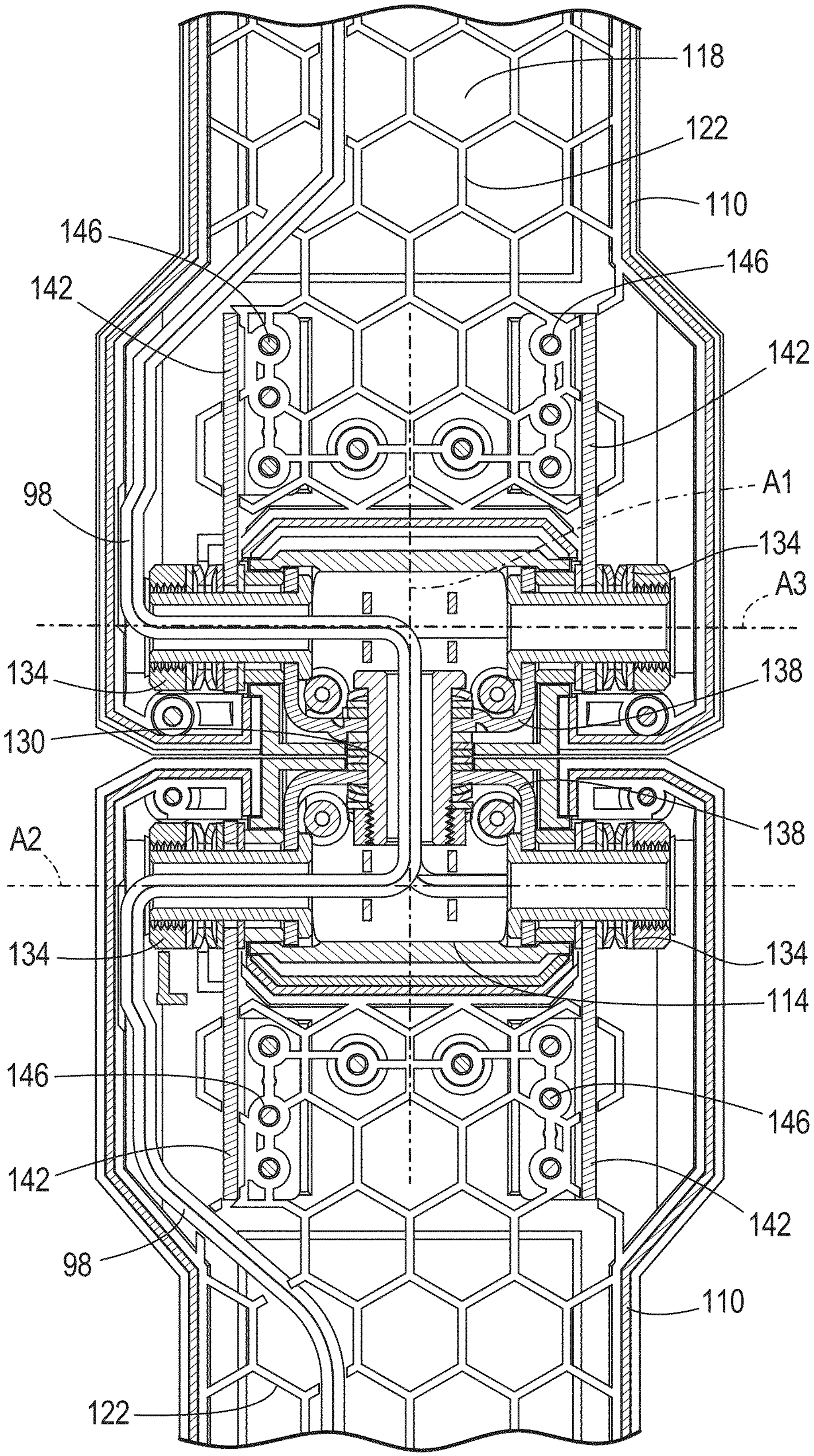
FIG. 6C is a cross-sectional view of the arm segments and the arm hinge taken along line 6C-6C in FIG. 6A.

As illustrated in FIGS. 6A-6C, the arm hinge 114 includes a hinge casing 126, a center joint 130 positioned between the two arm segments 110, and four head joints 134. The hinge casing 126 covers the center joint 130 and is configured to mate with, or attach to, the segment casing 118 of the arm segments 110. As such, the attachment between the segment casings 118 and the hinge casing 126 inhibits environmental ingress from reaching the center joint 130 and the plurality of head joints 134, thereby generally reducing rusting and improving the lifespan of the arm hinge 114. The hinge casing 126 is divided into two hinge casing halves or portions 126*a*, 126*b* that are configured to rotate relative to one another.

The center joint 130 is located substantially between, or in the center of, the four head joints 134. The center joint includes two U-shaped brackets 138 for coupling the center joint 130 to each of the plurality of head joints 134. Specifically, each of the U-shaped brackets 138 is coupled to two head joints 134. The center joint 130 is hollow to allow for the wiring 98 to pass therethrough. The center joint 130 defines a center joint axis or a first arm hinge axis A1. With reference to FIG. 1B and 6B, when the arm 18 is in the extended state, the first arm hinge axis A1 extends transverse to the base 14 along a lengthwise direction of the arm 18.

Each head joint 134 is at least partially received in the segment casing 118 of a corresponding one of the arm segments 110. Specifically, head joints 134 that are coupled to the same U-shaped bracket 138 of the center joint 130 are received by the same arm segment 110. Head joints 134 coupled to different U-shaped brackets 138 are received by different arm segments 110. As such, each of the arm segments 110 receives two head joints 134. Each head joint 134 includes a coupling bracket 142 that receives fasteners 146 for coupling the head joint 134 to the corresponding arm segment 110. Each head joint 134 is hollow to allow for the wiring 98 to pass therethrough. Each head joint 134 defines a head joint axis A2, A3. Head joints 134 coupled to the same arm segment 110 are coaxial and are therefore oriented along the same head joint axis A2, A3. Head joints 134 coupled to different arm segments 110 are oriented along different head joint axes A2, A3. Therefore, in the illustrated embodiment, the plurality of head joints 134 defines two head joint axes A2, A3, or a second arm hinge axis A2 and a third arm hinge axis A3. Both the second arm hinge axis A2 and the third arm hinge axis A3 are perpendicular to the first arm hinge axis A1. When the arm 18 is in the extended state, the second arm hinge axis A2 and the third arm hinge axis A3 are parallel to each other. In other configurations of the arm 18, as will be described in further detail, the second arm hinge axis A2 and the third arm hinge axis A3 may be skew.

With continued reference to FIGS. 6A-6C, the center joint 130 is configured to rotate, or twist, about the first arm hinge axis A1 at a midsection 130*a* of the center joint 130, and each of the head joints 134 is configured to rotate, or twist, about a corresponding one of the second arm hinge axis A2 and the third arm hinge axis A3. Due to the attachment between the coupling brackets 142 and the segment casings 118, rotation of the center joint 130 and the head joints 134 results in a rotation of the arm segments 110 relative to one another. As such, the arm hinge 114 enables the arm segments 110 to rotate relative to one another independently about each of the first arm hinge axis A1, the second arm hinge axis A2, and the third arm hinge axis A3.

Figure 7:
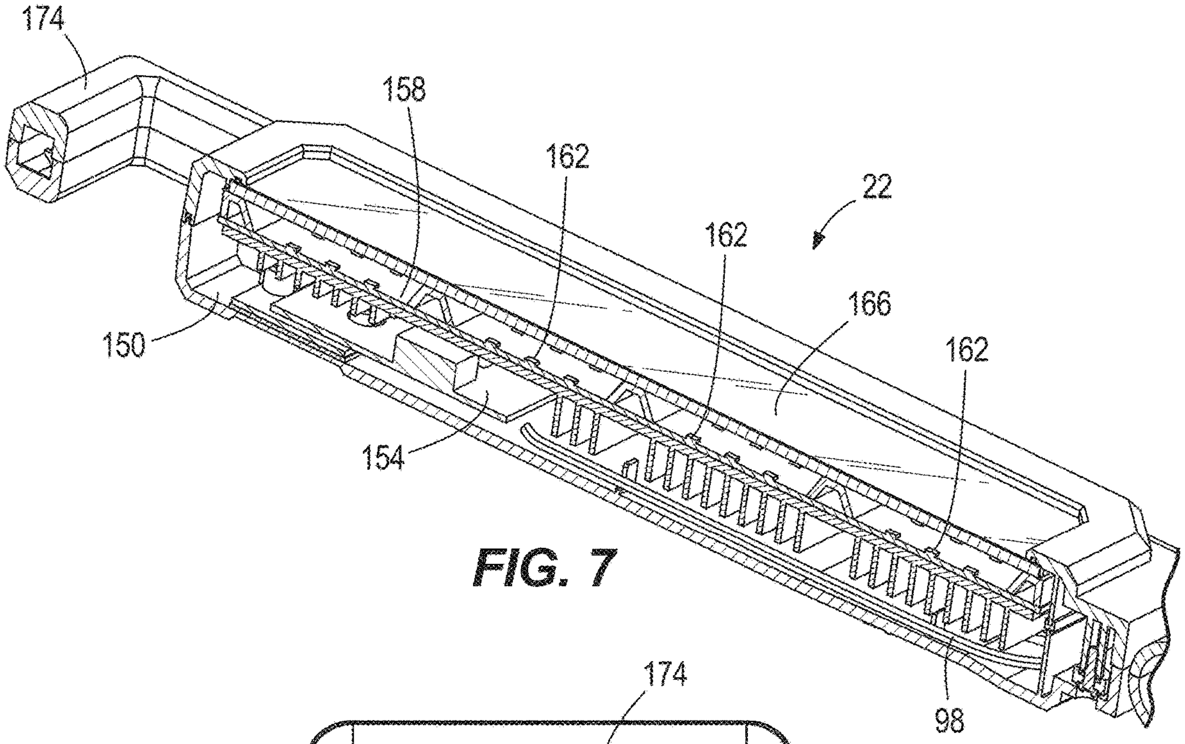
FIG. 7 is a cross-sectional view of the light fixture taken along line 7-7 in FIG. 1B.
Figure 8:
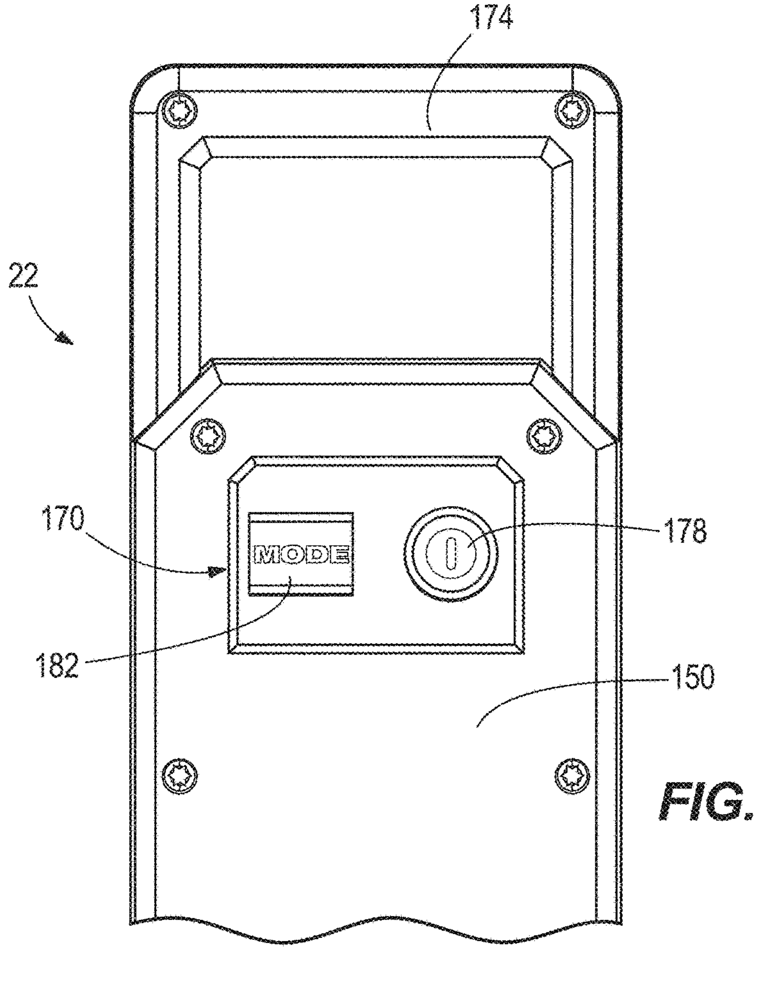
FIG. 8 is an enlarged rear view of a portion of the light fixture.

With reference to FIGS. 7 and 8, the light fixture 22 includes a fixture casing 150, a fixture PCBA 154, an LED PCBA 158, a plurality of light emitting diodes (i.e., LEDs) 162 arranged on the LED PCBA 158, a lens 166 received by the fixture casing 150 in front of the LEDs 162 along a light emitting direction, and a user interface 170. The fixture casing 150 may be substantially similar to the segment casing 118 of the arm segments 110. However, the fixture casing 150 is configured to accommodate the lens 166 and house the fixture PCBA 154, the LED PCBA 158, and the plurality of LEDs 162. Further, the fixture casing 150 forms a handle 174 that is graspable for manipulation and/or transportation of the boom light 10 (FIG. 1A). The fixture PCBA 154 is in electrical communication with the PCBA 94 disposed in the base 14 (FIG. 2B) via the wiring 98 (FIG. 6C). The fixture PCBA 154 is also in electrical communication with the LED PCBA 158 to supply power, or electricity, to the plurality of LEDs 162 for illuminating the plurality of LEDs 162 to emit light through the lens 166. The user interface 170 is disposed on a side of the fixture casing 150 that is opposite from the lens 166. The user interface 170 includes an actuator or power switch 178 for controlling (e.g., for turning on and off) a supply of power from the battery 30 to the light fixture 22 and a mode selection button 182 for selecting a mode of light emission for the light fixture 22. The power switch 178 is actuatable, or pressable, to turn the supply of power from the battery 30 to the light fixture on and off. The mode selection button 182 may, for example, control the strength of the light emitted from the light fixture 22.

Figure 9B:
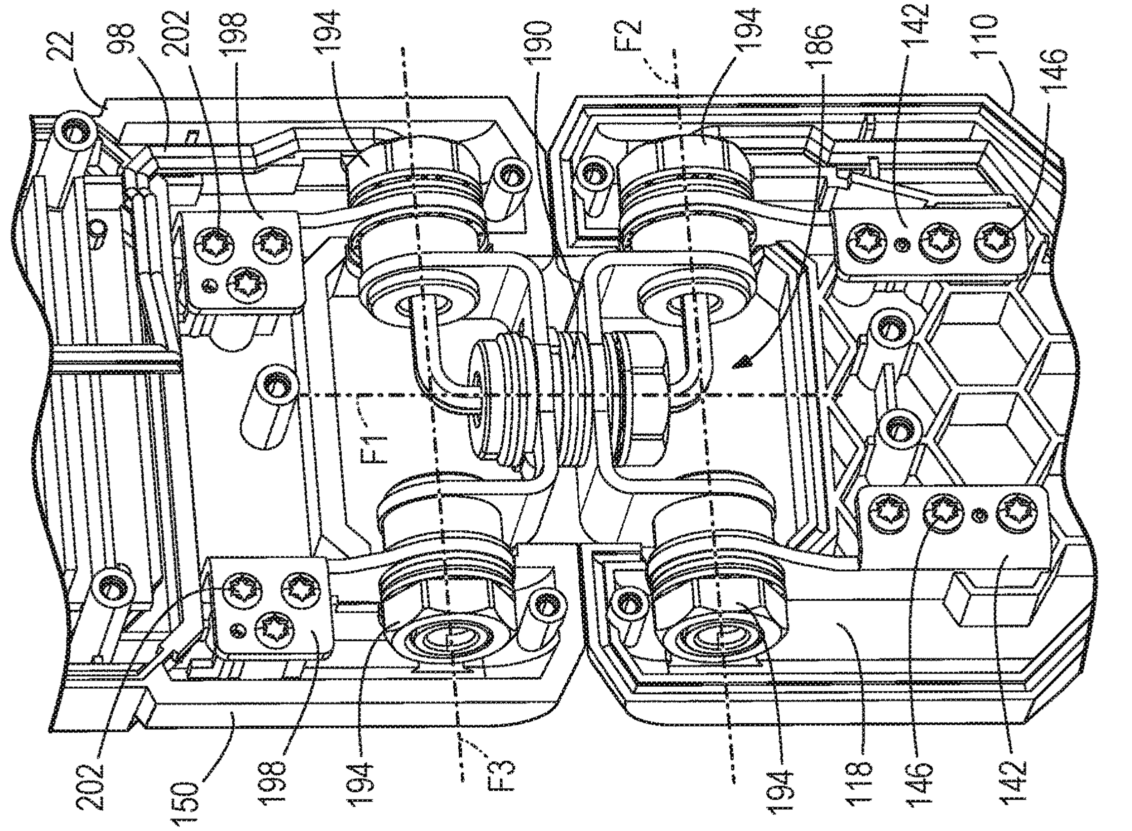
FIG. 9B is a perspective view of the portions of the light fixture, the one of the arm segments, and the light fixture hinge illustrated in FIG. 9A with a portion of each of the light fixture, the one of the arm segments, and the light fixture hinge removed.
Figure 9A:
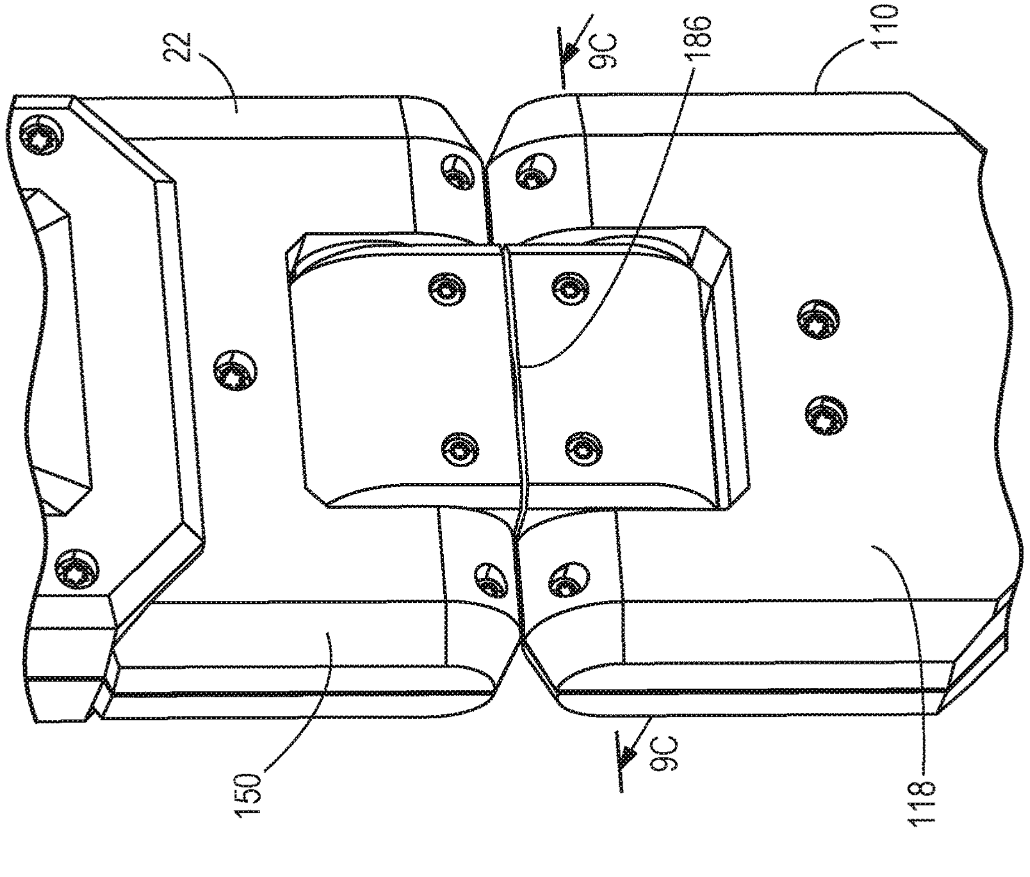
FIG. 9A is an enlarged view of portions of the light fixture, one of the arm segments, and a light fixture hinge.
Figure 9C:
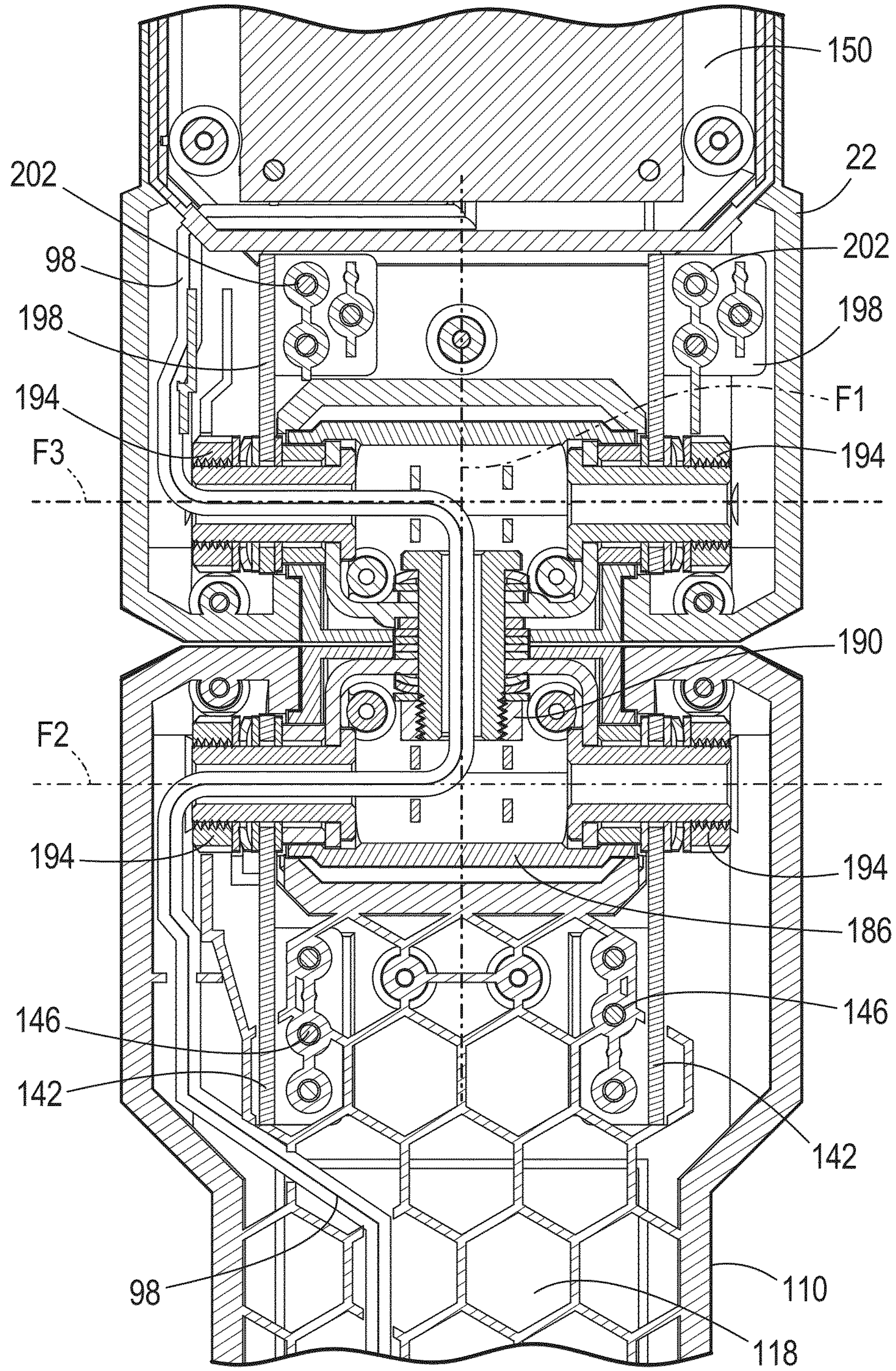
FIG. 9C is a cross-sectional view of the light fixture, the one of the arm segments, and the light fixture hinge taken along line 9C-9C in FIG. 9A.

As illustrated in FIGS. 9A-9C, the light fixture 22 is coupled to an end of the arm 18 opposite from the base 14 (FIG. 2A). In other words, the light fixture 22 is coupled to the last arm segment 110 of the arm 18 (e.g., the second arm segment 110). The light fixture 22 is attached to the end of the arm 18 through engagement with a light fixture hinge 186 that is disposed between the last arm segment 110 and the light fixture 22. The light fixture hinge 186 is substantially similar to the arm hinge 114. As such, the light fixture hinge 186 includes a center joint 190 and a plurality of head joints 194 including coupling brackets 198 for securing the light fixture 22 to the light fixture hinge 186 via fasteners 202. The coupling brackets 198 of the light fixture hinge 186 are shaped differently than the coupling brackets 198 of the arm hinge 114 to accommodate the components of the light fixture 22 described above. The center joint 190 defines a first light fixture axis F1, and the plurality of head joints 194 defines a second light fixture axis F2 and a third light fixture axis F3. As such, the light fixture hinge 186 enables the light fixture 22 and the last arm segment 110 to rotate relative to one another independently about each of the first light fixture hinge axis F1, the second light fixture hinge axis F2, and the third light fixture hinge axis F3.

With reference to FIGS. 2B, 3, 6C, 7, and 9C, to extend from the PCBA 94 in the base 14 to the fixture PCBA 154, the wiring 98 passes through the base hinge 46, the arm hinge 114 disposed between the two arm segments 110, and the light fixture hinge 186 is disposed between the last arm segment 110 and the light fixture 22. Specifically, the wiring 98 passes through the base hinge 46 by passing through the center shaft 78 and one of the head joints 82 in the base hinge 46. The wiring 98 then passes through the arm hinge 114 by passing through the center joint 130 and just one of the head joints 134 disposed in each of the arm segments 110. Finally, the wiring 98 passes through the light fixture hinge 186 by passing through the center joint 190, one of the head joints 194 in the last arm segment 110, and one of the head joints 194 in the light fixture 22. As such, the wiring 98 may be susceptible to damage from overtwisting caused by rotation of each of the base hinge 46, the arm hinge 114, and the light fixture hinge 186.

Each of the center shaft 78 of the base hinge 46, the center joint 130 of the arm hinge 114, and the center joint 190 of the light fixture hinge 186 includes an integrated hard stop to inhibit over-rotation and reduce damage to the wiring 98 from over-rotation. In the illustrated embodiment, the integrated hard stop for the center shaft 78 of the base hinge 46 limits rotation of the arm 18 about the first base hinge axis B1 to 320 degrees of rotation. The integrated hard stop for the center joint 130 of the arm hinge 114 limits rotation of the arm segments 110 relative to one another about the first arm hinge axis A1 to 270 degrees of rotation. The integrated hard stop for the center joint 190 of the light fixture hinge 186 limits rotation of the last arm segment 110 and the light fixture 22 relative to one another about the first light fixture axis F1 to 300 degrees. In other embodiments, the hard stops may limit rotation of each hinge a greater or lesser amount. In still other embodiments, the hard stops may be omitted.

In the illustrated embodiment, the head joints 82, 134, 194 in each of the base hinge 46, the arm hinge 114, and the light fixture hinge 186 do not include integrated hard stops because each of the head joints 82, 134, 194 includes physical limitations that inhibit over-rotation. For example, the first arm segment 110 is limited in rotation about the head joints 82 of the base hinge 46 by the base 14, each of the arm segments 110 limit rotation of the other of the arm segments 110 about the head joints 134 of the arm hinge 114, and the light fixture 22 and the last arm segment 110 limit rotation relative to each other about the head joints 194 of the light fixture hinge 186. In other embodiments, the head joints 82, 134, 194 of each hinge 46, 114, 186 may include integrated hard stops to further constrain the motion of the arm 18 and the light fixture 22 relative to each other and to the base 14.

As illustrated in FIGS. 10A-10D, the manual release assist mechanism 26 includes a handle 206, handle legs 210 extending from each end of the handle 206, a roller bar casing 214 disposed at an end of the handle legs 210 opposite from the handle 206 and extending between the handle legs 210, and a roller bar 218 received in the roller bar casing 214. Each of the handle legs 210 includes a coupling receptacle 222 that receives a corresponding one of the coupling tabs 62 from the base 14. A pivot pin 226 extends through each coupling receptacle 222 and the corresponding coupling tab 62 to secure the manual release assist mechanism 26 to the base 14. The pivot pins 226 define a pivot point for the manual release assist mechanism 26 to rotate, or pivot, relative to the base 14. The roller bar 218 includes a plurality of rollers 230 that are rotatably mounted to the roller bar 218.

Figure 11A:
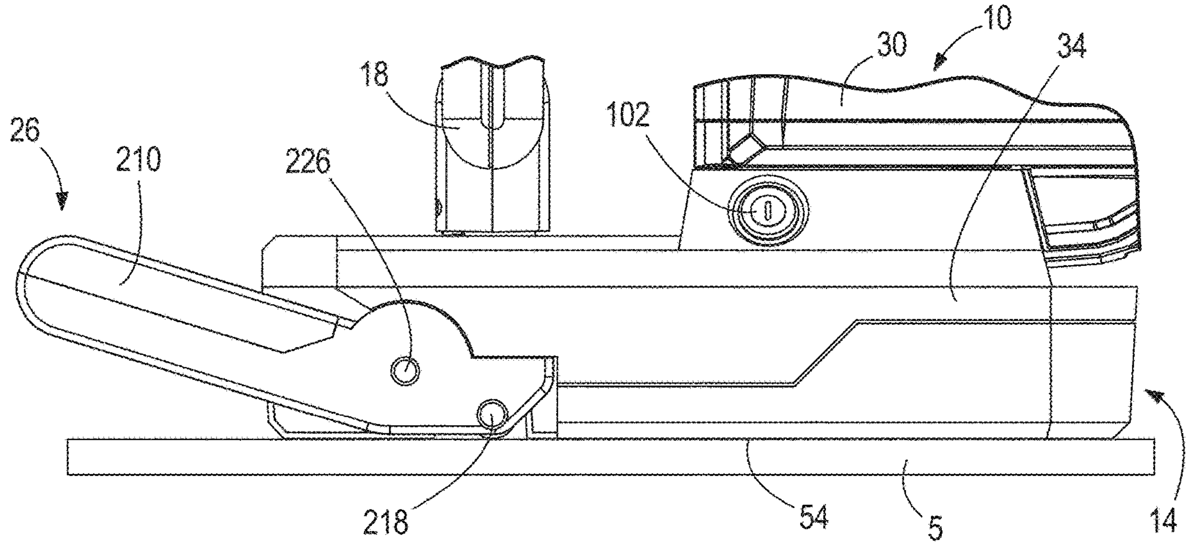
FIG. 11A is a plan view of the base of the boom light with the manual release assist mechanism disengaged from a work surface.
Figure 11B:
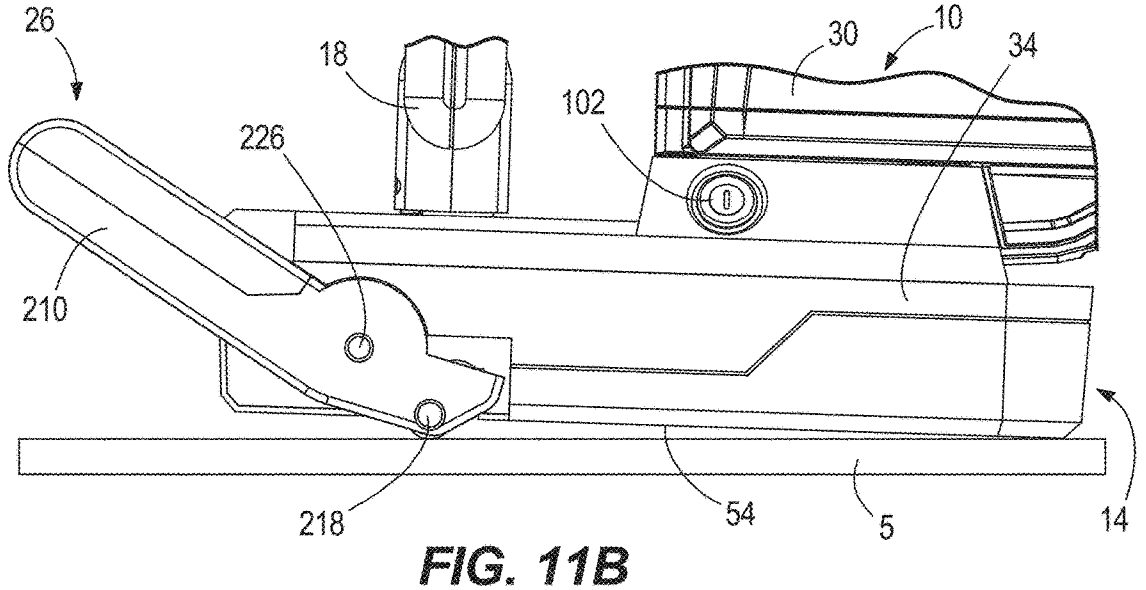
FIG. 11B is a plan view of the base of the boom light with the manual release assist mechanism engaged with the work surface.

With reference to FIGS. 11A and 11B, the manual release assist mechanism 26 is pivotable about the pivot pins 226 between an inactive state and an active state. In the inactive state (FIG. 11A), the manual release assist mechanism 26 is oriented such that the roller bar 218 is disposed in the inlet 58 (FIG. 10B) of the magnetic surface 54. With the roller bar 218 disposed in the inlet 58 (FIG. 10B) in the magnetic surface 54, the manual release assist mechanism 26 is disengaged with any outside surfaces or workpieces. In the active state (FIG. 11B), the roller bar 218 is disposed at least partially outside of inlet 58 (FIG. 10B) in the magnetic surface 54. With the roller bar 218 disposed outside of the inlet 58 (FIG. 10B) in the magnetic surface 54, the manual release assist mechanism 26 is configured to engage an outside surface, such as the work surface 5. As such, the plurality of rollers 230 mounted to the roller bar may reduce friction and wear between the roller bar 218 and the work surface 5 when the manual release assist mechanism 26 is in the active state.

With reference to FIGS. 1A and 1B, to use the boom light 10 to illuminate a work area, the magnetic surface 54 may be placed directly on a work surface 5 or in a desired location adjacent to a work surface 5. The magnetic surface 54 creates a magnetic connection between the boom light 10 and the work surface 5 (or an adjacent surface) that rigidly secures the boom light 10 to the work surface 5 (or an adjacent surface). With the base 14 secured in a desired location, the arm 18 and the light fixture 22 may then be adjusted (e.g., unfolded) so that the lens 166 of the light fixture 22 faces the work surface 5 at a desired angle. Specifically, with reference to FIGS. 1B, 3, 6C, and 9C, the arm segment 110 connected to the base 14 may be rotated about the first base hinge axis B1 and the second base hinge axis B2, each of the arm segments 110 may be rotated relative to the other of the arm segments 110 about the first arm hinge axis A1, the second arm hinge axis A2, and/or the third arm hinge A3, and the light fixture 22 and the last arm segment 110 may be rotated relative to one another about the first light hinge axis F1, the second light hinge axis F2, and/or the third light hinge axis F3. Once the arm 18 and the light fixture 22 have been adjusted so that the lens 166 of the light fixture 22 faces the work surface 5 at a desired angle, the power switch 102 (FIG. 2A) on the base 14 or the power switch 178 (FIG. 8) on the light fixture 22 may be actuated to begin supplying electricity to the light fixture 22 for emitting light from the lens 166.

Once the boom light 10 is no longer needed or once it is desired to move the boom light 10 to a new location, the boom light 10 may be removed from the work surface 5 (or an adjacent surface) by applying a force to the base 14 in a direction away from the work surface 5 that overcomes, or is greater than, the force created by the magnetic connection between the magnetic surface 54 and the work surface 5 (or an adjacent surface). In some instances, the magnetic connection may create a force that is overly strong, thereby making removal of the base 14 from the work surface 5 difficult to achieve. In such instances, the manual release assist mechanism 26 may be used to alleviate or reduce the strength the force created by the magnetic connection between the magnetic surface 54 and the work surface 5 (or an adjacent surface). As such, the manual release assist mechanism 26 is configured to reduce the force required to remove the base 14 from the work surface 5 (or an adjacent surface).

In the illustrated embodiment, with reference to FIGS. 11A and 11B, to engage the manual release assist mechanism 26, a user may grasp the handle 206 and pull (e.g., rotate) the handle 206 in a direction away from the work surface 5. By pulling the handle 206 in a direction away from the work surface 5, the manual release assist mechanism 26 begins to pivot about the pivot pins 226 from the inactive state to the active state. Specifically, as the handle 206 is pulled, the roller bar 218 is pivoted out of the inlet 58 (FIG. 10B) in the magnetic surface 54 and into engagement with the work surface 5. Therefore, the roller bar 218 may also be referred to as a ground engaging portion. As such, the pulling force on the handle 206 applies leverage to the work surface 5 through the roller bar 218 such that the strength of the force created by the magnetic connection is reduced. The leverage applied by the handle 206 through the roller bar 218 may also lift a portion of the magnetic surface 54 from the work surface 5 such that at least one of the plurality of magnets 106 (FIG. 2B) is no longer engaged (e.g., in contact) with the work surface 5. A user may then remove the remaining portion of the magnetic surface 54 from the work surface 5 with a force that is less than the force that would have been required to separate the magnetic surface 54 and the work surface 5 in absence of the manual release assist mechanism 26.

Figure 12:
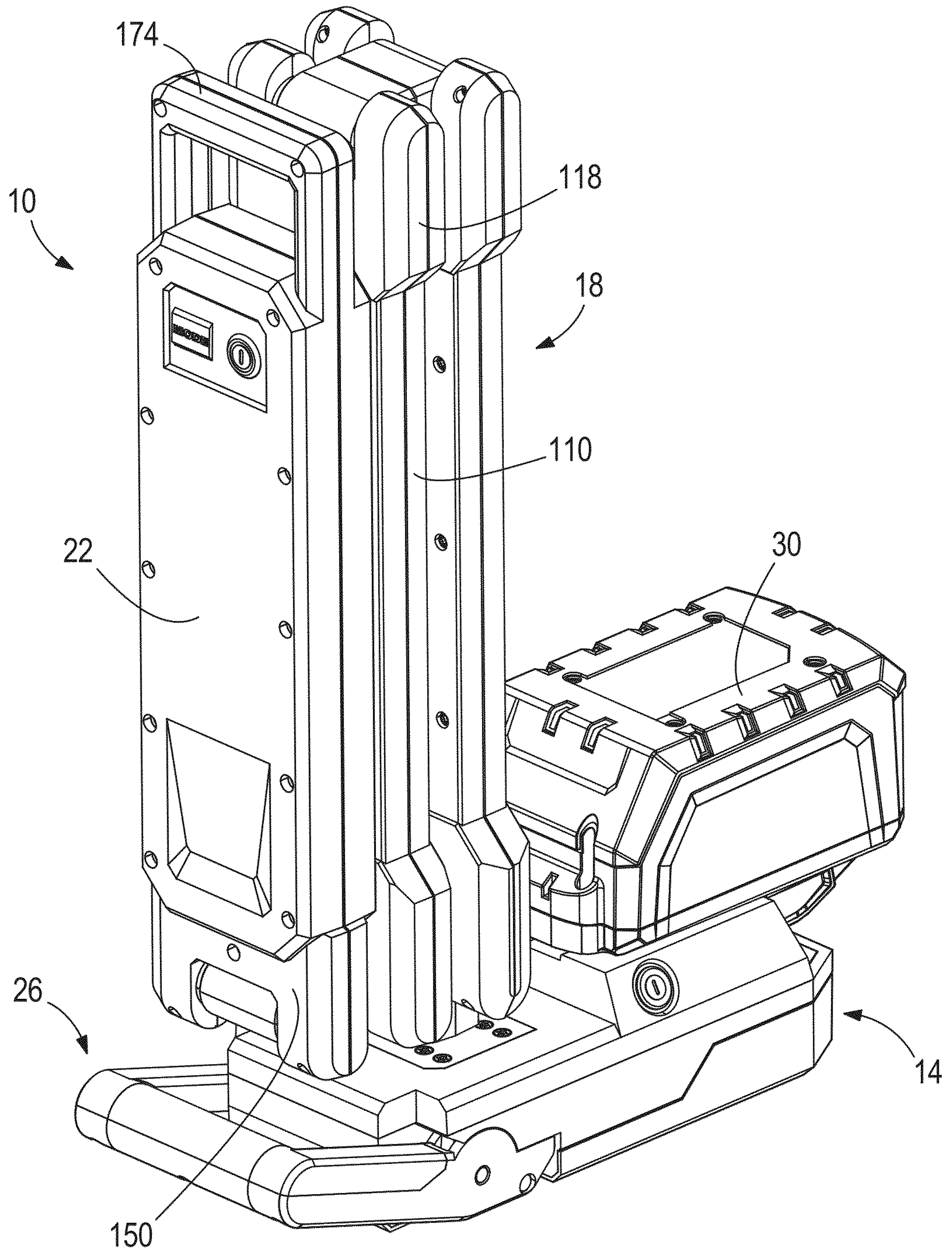
FIG. 12 is a perspective view of the work light configured in the collapsed state with the light fixture configured in a transport state.

With reference to FIGS. 1A and 12, once use of the boom light 10 is completed, the arm 18 may be returned to the first collapsed state (FIG. 1A), and the light fixture 22 may be further adjusted to a transport state (FIG. 12). In the transport state, the light fixture 22 is oriented (e.g., folded) such that the lens 166 directly faces the last arm segment 110. As such, the segment casing 118 of the last arm segment 110 and the fixture casing 150 of the light fixture 22 may protect the lens 166 from damage in the transport state. With the light fixture 22 configured in the transport state, the handle 174 on the light fixture 22 may be grasped for transporting the boom light 10. Although not illustrated, the light fixture 22 may be adjusted to the transport state (FIG. 12) when the arm 18 is in the second collapsed state (FIG. 1C), the third collapsed state (FIG. 1D), or any other collapsed configuration in which a face of the light fixture 22 abuts, or extends parallel to, the last arm segment 110.

Figure 13:
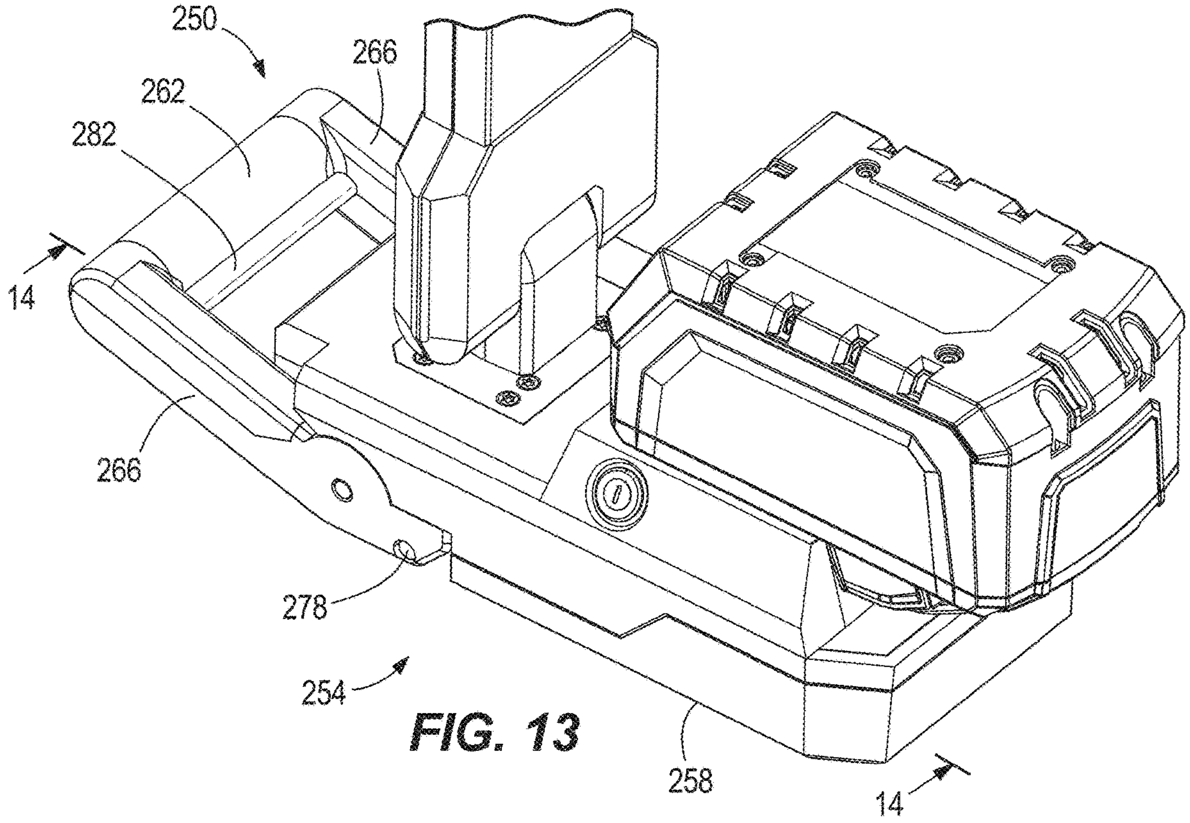
FIG. 13 is a perspective view of a base and a manual release assist mechanism according to another embodiment of the disclosure.
Figure 14:
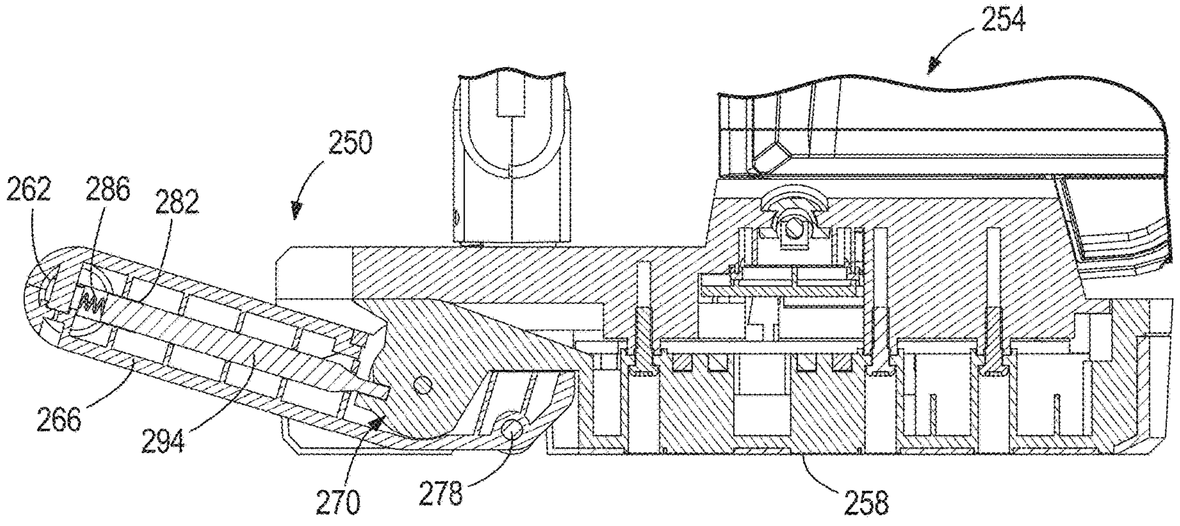
FIG. 14 is a cross-sectional view of the base and the manual release assist mechanism taken across line 14-14 in FIG. 13.

FIGS. 13 and 14 illustrate another embodiment of a manual release assist mechanism 250 for a base 254 that is substantially similar to the base 14 of FIG. 1A and includes a magnetic surface 258 configured to be attached to a work surface such as the work surface 5 of FIG. 1A. The manual release assist mechanism 250 is substantially similar to the manual release assist mechanism 26 of FIGS. 10A-10D, except for the differences described herein. As illustrated in FIGS. 13 and 14, the manual release assist mechanism 250 includes a handle 262, handle legs 266 extending from each side of the handle 262 and having connection receptacles 270, a roller bar 278 extending between the handle legs 266, and a release actuator 282. The release actuator 282 is partially received in and extends out of a forward side of the handle 262. The release actuator 282 includes actuator springs 286 and two actuator leg portions 294. The actuator springs 286 are located within the handle 262 and bias the release actuator 282 out of the handle 262. Each of the actuator leg portions 294 extend along a corresponding one of the handle legs 266 and into one of the connection receptacles 270 of the handle legs 266. As such, the actuator leg portions 294 create an interference with the base 254 within the connection receptacles 270 that inhibits rotation of handle legs 266.

Therefore, the release actuator 282 effectively provides a locking mechanism for the manual release assist mechanism 250. In the illustrated embodiment of FIGS. 13 and 14, to engage the manual release assist mechanism 250, the release actuator 282 may be pulled against the bias of the actuator springs 286, thereby pulling the actuator leg portions 294 out of the connection receptacles 270. With the actuator leg portions 294 removed from the connection receptacles 270, the manual release assist mechanism 250 may then be engaged substantially similarly to the manual release assist mechanism 26 of FIGS. 11A and 11B.

Figure 15A:
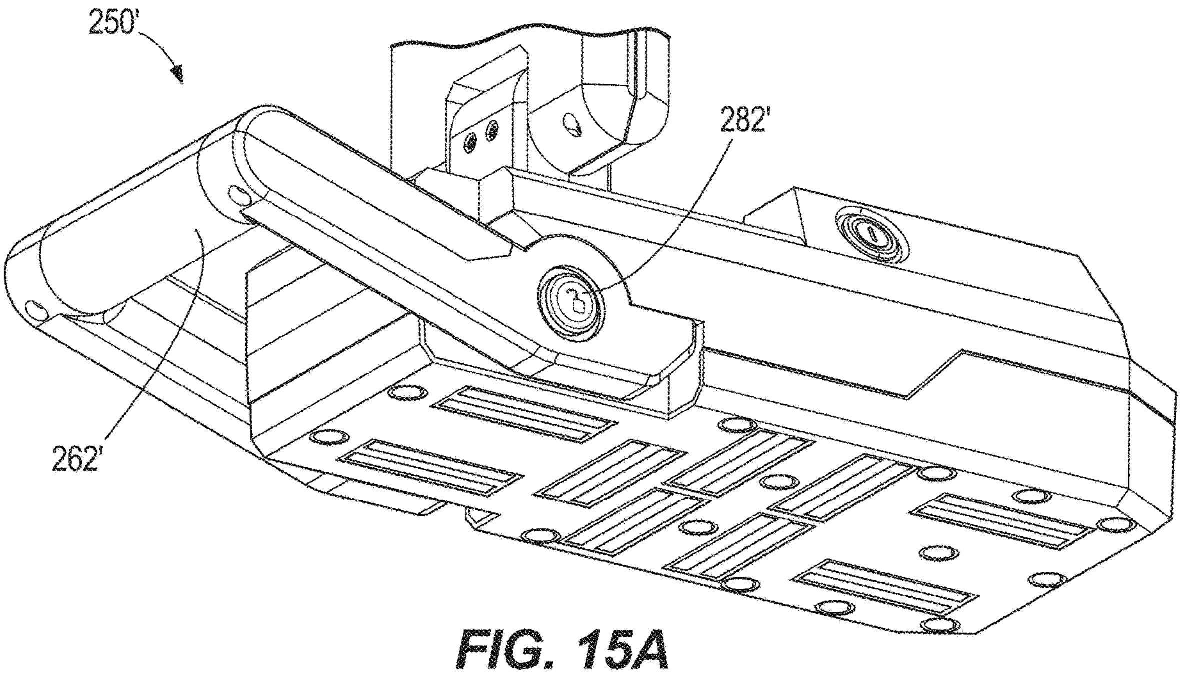
FIG. 15A is a schematic view of a manual release assist mechanism according to another embodiment of the disclosure.

In another embodiment of a manual release assist mechanism 250', as illustrated in FIG. 15A, the manual release assist mechanism 250' includes a release actuator 282' that is formed as a push button. The illustrated release actuator 282' is aligned with the pivot axis of the manual release assist mechanism 250'. As such, the release actuator 282' may be pressed, or pushed, to engage and disengage a locking mechanism in the manual release assist mechanism 250'. That is, the release actuator 282' includes an interference creating structure (such as the actuator leg portions 294 of FIGS. 13 and 14) that is configured to inhibit rotation of a handle 262' of the manual release assist mechanism 250'. As such, pressing, or pushing, the release actuator 282' influences the interference creating structure to insert, or to remove, an interference that inhibits rotation of the handle 262'.

Figure 15B:
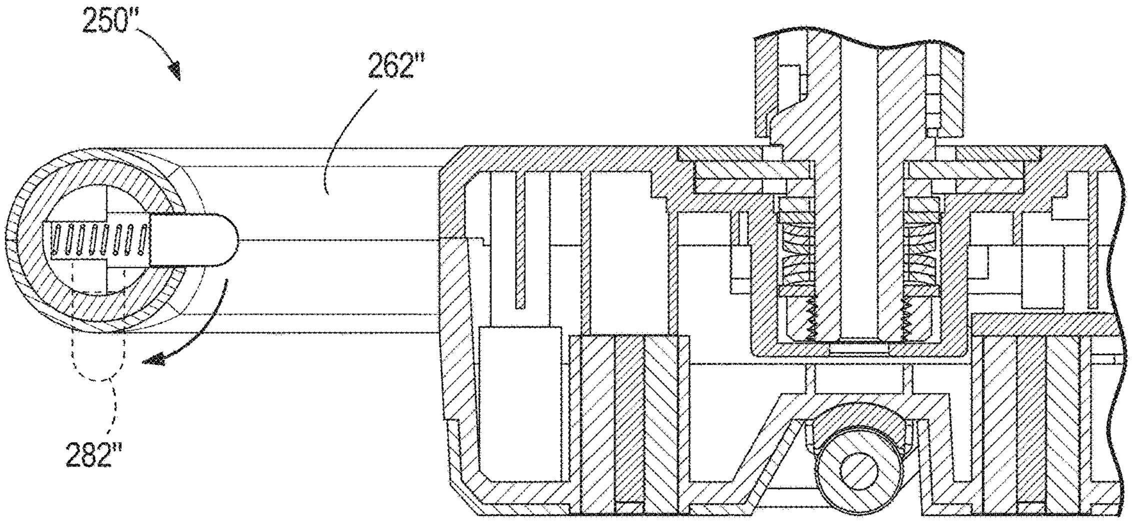
FIG. 15B is a schematic view of a manual release assist mechanism according to another embodiment of the disclosure.

In another embodiment of a manual release assist mechanism 250", as illustrated in FIG. 15B, the manual release assist mechanism includes a handle 262" and a release actuator 282" that is rotated 90 degrees compared to the release actuator 282 of FIG. 14. As such, the release actuator 282" is biased out of a bottom of the handle 262". A user may then pull the release actuator 282" in a direction extending away from a work surface to enable movement of the handle 262". By biasing the release actuator 282" out of the bottom of the handle 262", actuation (e.g., via a pulling motion) of the release actuator 282" may be a more natural motion for a user as the user pulls the handle 262" in a direction away from a work surface.

Figure 16A:
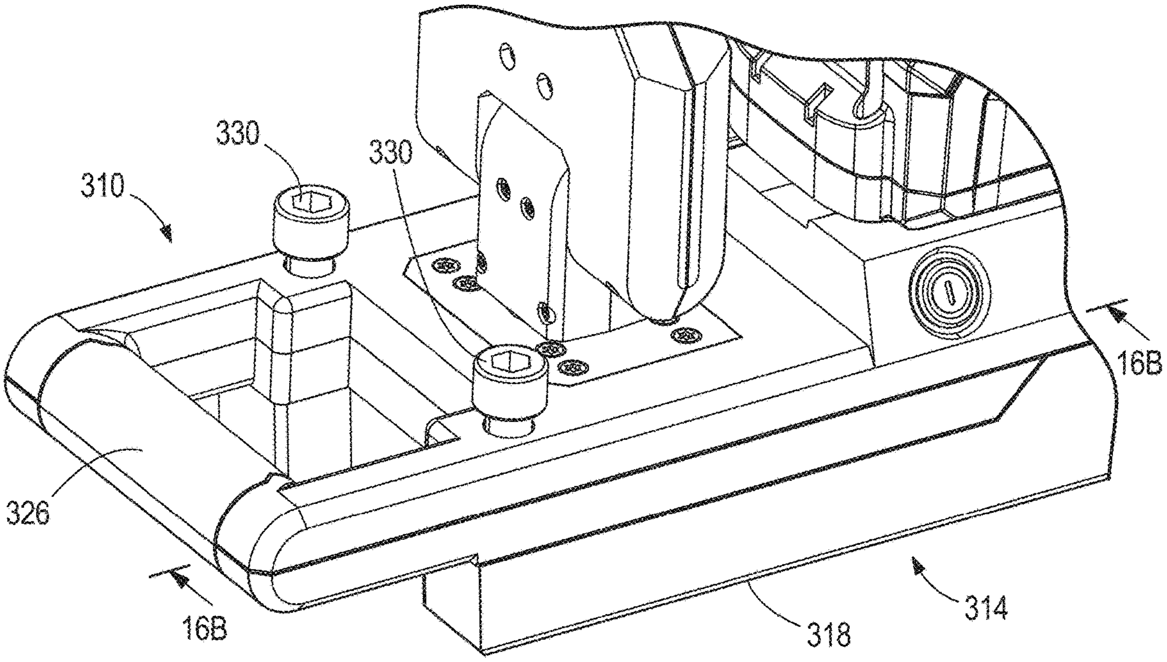
FIG. 16A is a perspective view of a base and a manual release assist mechanism according to another embodiment of the disclosure.
Figure 16B:
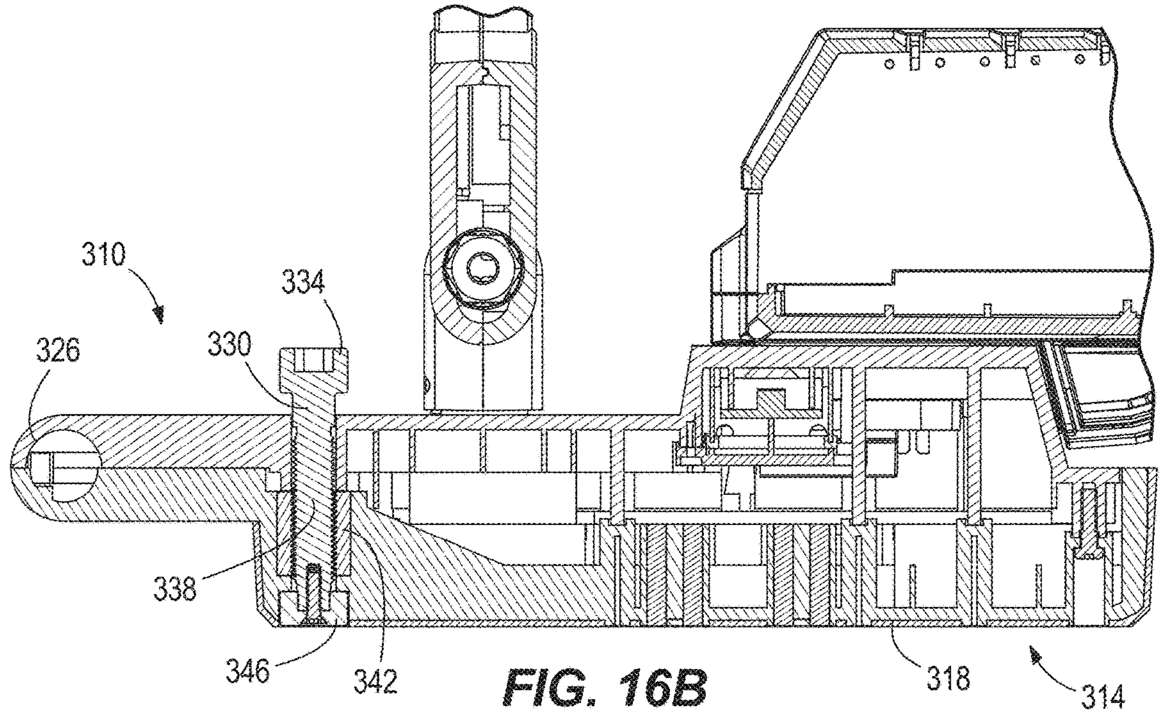
FIG. 16B is a cross-sectional view of the base and the manual release assist mechanism taken along line 16B-16B in FIG. 16A.
Figure 17A:
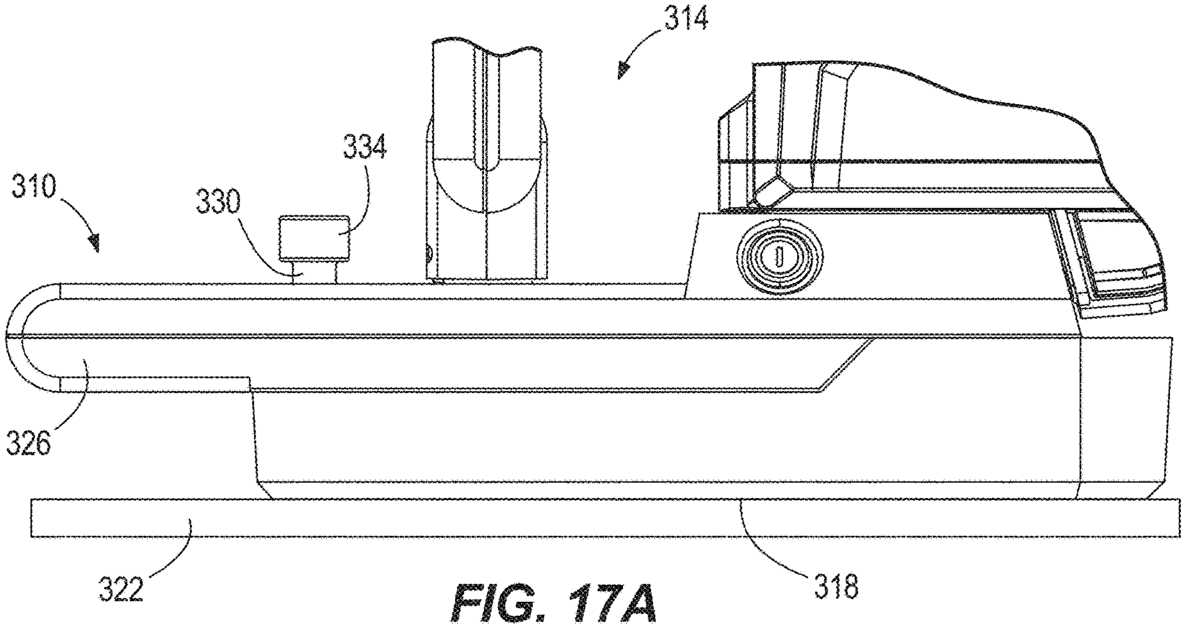
FIG. 17A is a plan view of the base with the manual release assist mechanism of FIG. 16A disengaged from a work surface.

FIGS. 16A and 16B illustrate another embodiment of a manual release assist mechanism 310 for a base 314 that is substantially similar to the base 14 of FIG. 1A and includes a magnetic surface 318 configured to be attached to a work surface 322 (FIG. 17A). The manual release assist mechanism 310 includes a handle 326 extending from an end of the base 314 and lift screws 330 extending through the base 314 adjacent to the handle 326. The handle 326 is rigidly formed with the base 314. As such, the handle 326 is not able to rotate relative to the base 314. In the illustrated embodiment, the manual release assist mechanism 310 includes two lift screws 330 that are drivable to move the lift screw 330 towards the work surface 322, as will be described in more detail. In other embodiments, the manual release assist mechanism 310 may include just a single lift screw 330 or more than two lift screws 330. With reference to FIG. 16B, each lift screw 330 includes a screw head 334, a threaded screw shaft 338, a bore 342 fixed to the base 314 and threadedly supporting the threaded screw shaft 338, and a rigid end cap 346 attached to an end of the threaded screw shaft 338. The screw head 334 protrudes from and is disposed a distance from the base 314. The threaded screw shaft 338 extends to the rigid end cap 346 which is located at, but does not protrude from, the magnetic surface 318 of the base 314. The bore 342 receives the threaded screw shaft 338 and threadedly supports the shaft 338 to inhibit undesired or unintended movement of the lift screw 330 relative to the base 314.

Figure 17B:
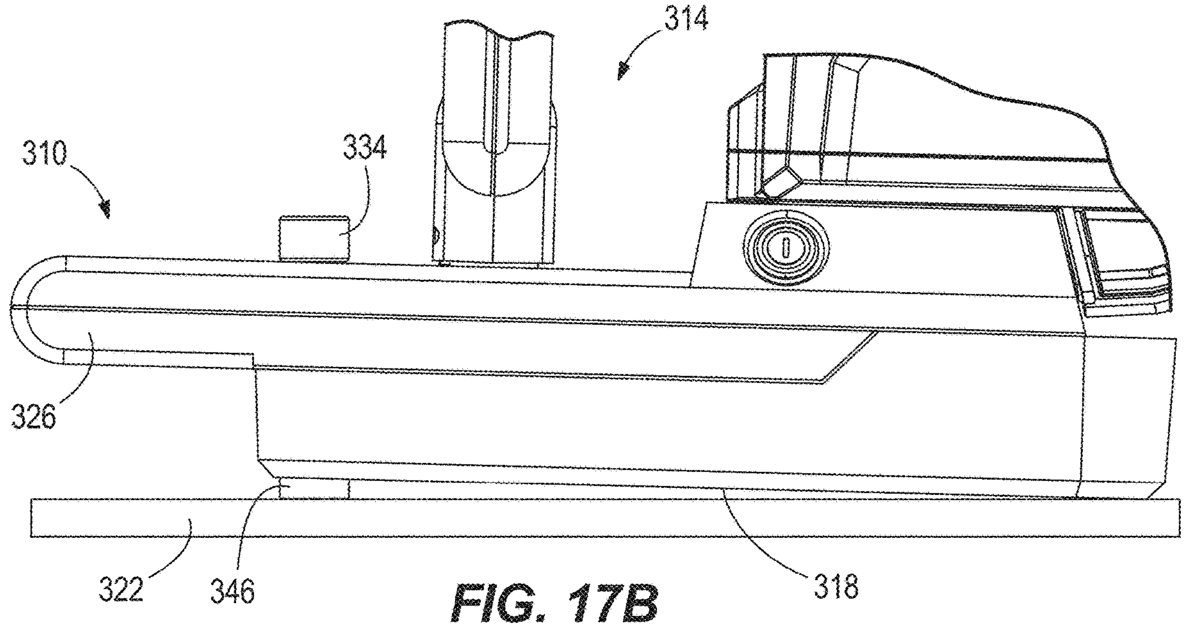
FIG. 17B is a plan view of the base with the manual release assist mechanism of FIG. 16A engaged with the work surface.
Figure 18:
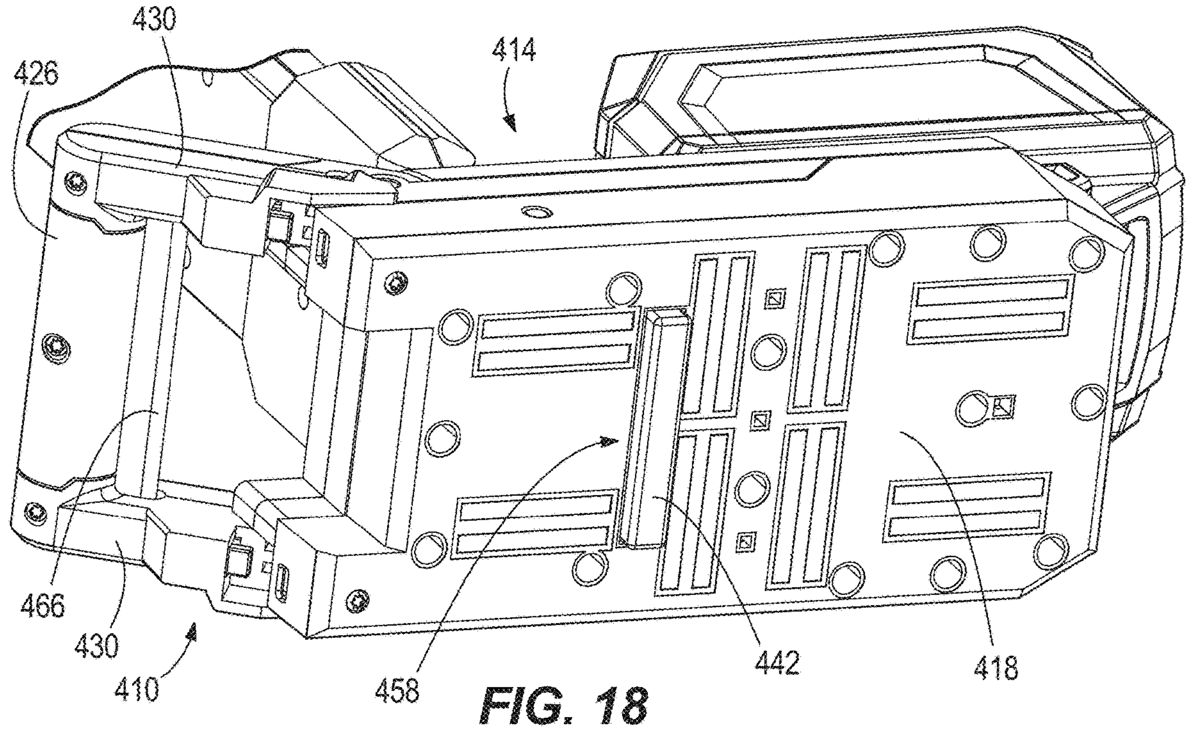
FIG. 18 is a bottom perspective view of a base and a manual release assist mechanism according to another embodiment of the disclosure.
Figure 19:
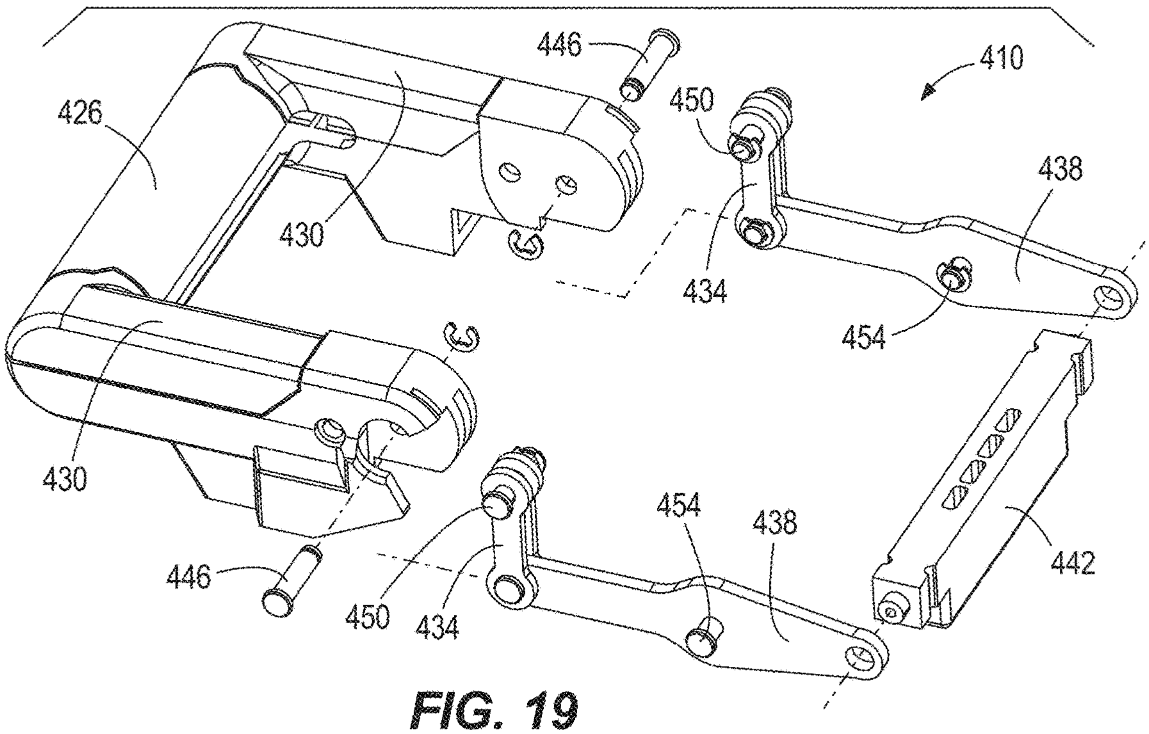
FIG. 19 is an exploded view of the manual release assist mechanism of FIG. 18.
Figure 20A:
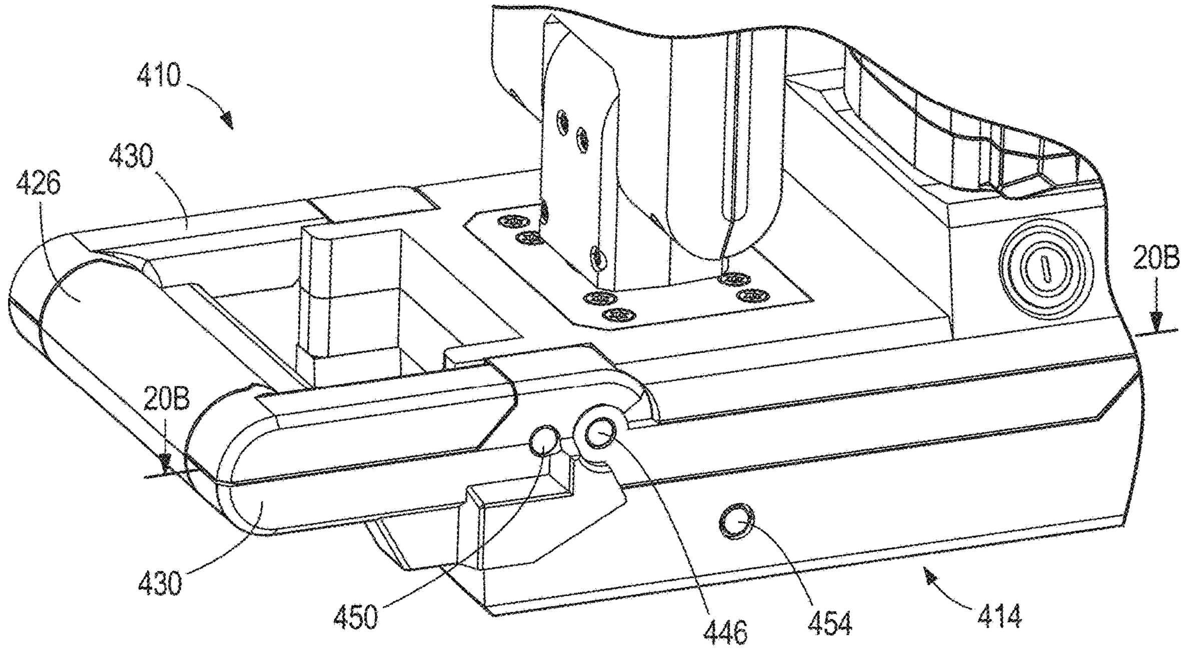
FIG. 20A is a top perspective view of a portion of the base and the manual release assist mechanism of FIG. 18.
Figure 20B:
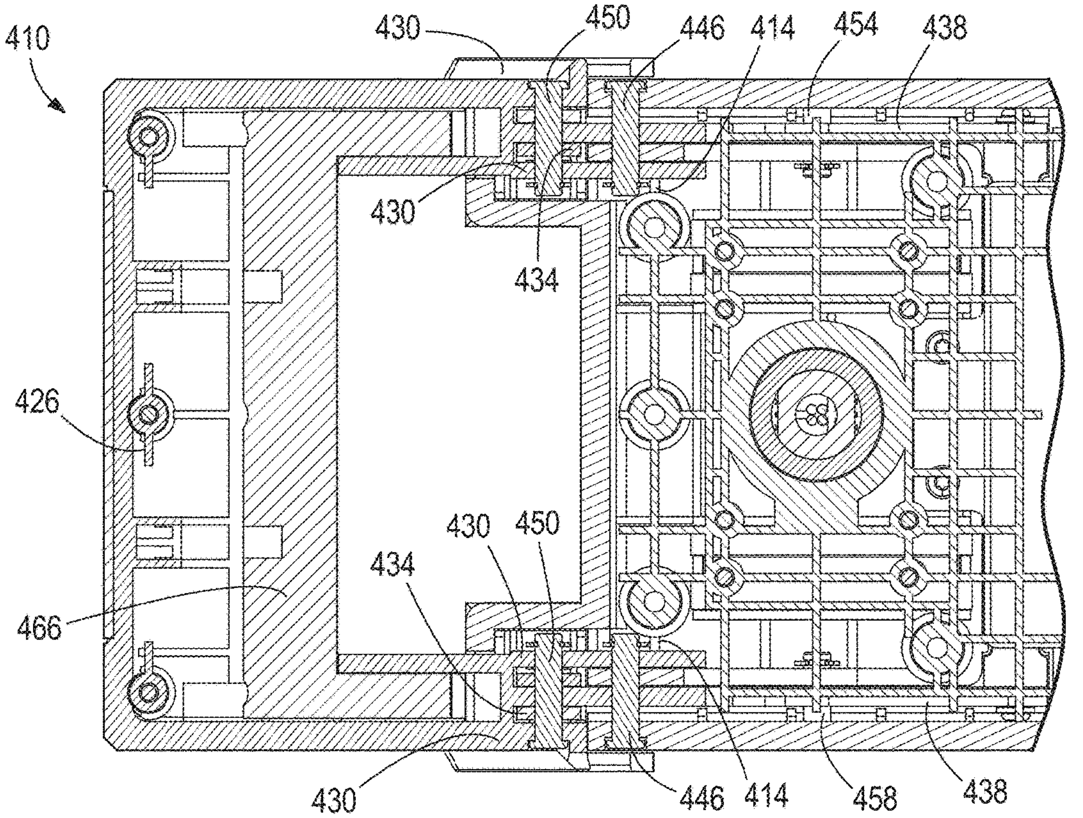
FIG. 20B is a cross-sectional view of a portion of the base and the manual release assist mechanism taken along line 20B-20B in FIG. 20A.

With reference to FIGS. 17A and 17B, to engage the manual release assist mechanism 310, a user may operate a power tool, such as, for example, an impact driver, to drive the lift screws 330 toward the work surface 322. Specifically, a power tool may engage the screw head 334 to drive the threaded screw shaft 338 for movement relative to the bore 342 in a direction toward the work surface 322. In other embodiments, a user may operate a hand tool, such as a screwdriver, wrench, socket wrench, or Allen wrench, to drive the lift screws 330. As the threaded screw shaft 338 is driven relative the bore 342, the end of threaded screw shaft 338 pushes the rigid end cap 346 into engagement with the work surface 322. Therefore, the rigid end cap 346 may also be referred to as a ground engaging portion. By driving the lift screw 330 toward the work surface 322, a force is applied from the rigid end cap 346 of each of the lift screws 330 to the work surface 322 to separate at least a portion of the magnetic surface 318 from the work surface 322. As such, the force applied by the rigid end cap 346 of each of the lift screws 330 to the work surface 322 alleviates the strength of the magnetic connection between the magnetic surface 318 of the base 314 and the work surface 322. A user may then remove the remaining portion of the magnetic surface 318 from the work surface 322 with a force that is less than the force that would have been required to separate the magnetic surface 318 and the work surface 322 in absence of the manual release assist mechanism 310.

Figure 21A:
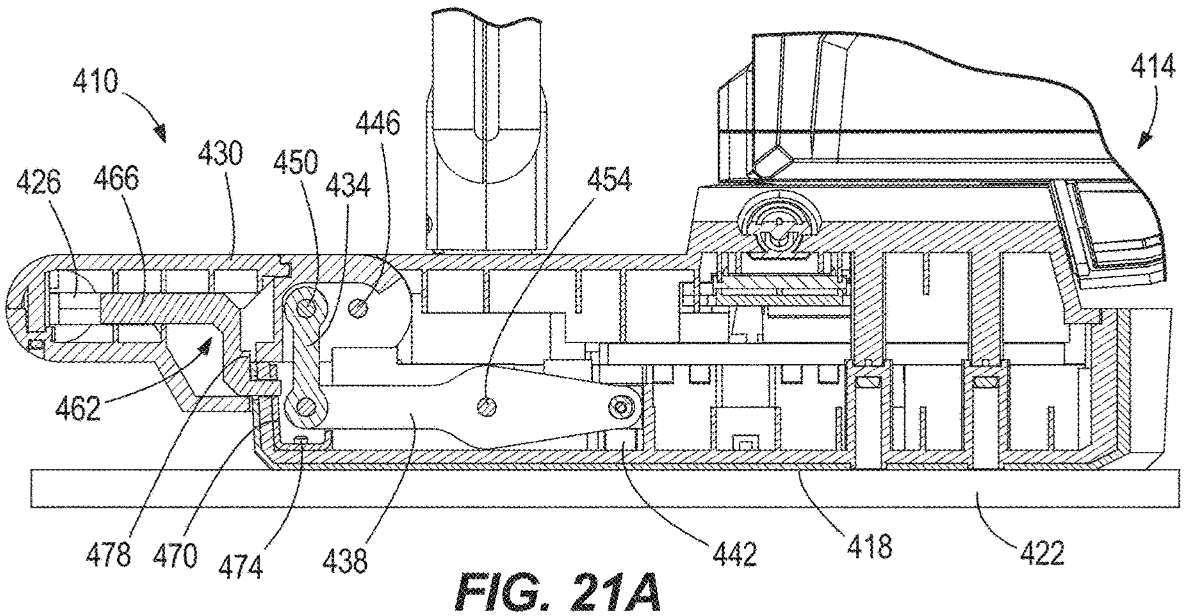
FIG. 21A is a side cross-sectional view of the base with the manual release assist mechanism of FIG. 20A disengaged from a work surface.

FIGS. 18-20B illustrate another example of a manual release assist mechanism 410 for a base 414 that is substantially similar to the base 14 of FIG. 1A and includes a magnetic surface 418 configured to be attached to a work surface 422 (FIG. 21A). The manual release assist mechanism 410 includes a handle 426, two handle legs 430, two first connecting bars 434, two second connecting bars 438, and a lift bar 442 coupled between the two second connecting bars 438. Each of the handle legs 430 receives a first fastener 446 and a second fastener 450. The first fastener 446 couples the handle legs 430 to the base 414. As such, the handle legs 430 are rotationally constrained relative to the base 414 about the first fastener 446. The second fastener 450 couples each of the handle legs 430 to a corresponding one of the first connecting bars 434. As such, the first connecting bars 434 are configured to move with the handle legs 430 relative to the base 414. Each of the second connecting bars 438 is coupled to a corresponding one of the first connecting bars 434. As such, the second connecting bars 438 are configured to move with the first connecting bars 434 and the handle legs 430. The lift bar 442 is coupled to each of the second connecting bars 438 at an end of the second connecting bars 438 opposite from the first connecting bars 434. As such, the lift bar 442 is configured to move with the second connecting bars 438, the first connecting bars 434, and the handle legs 430. The first connecting bars 434 and the second connecting bars 438 therefore form a link assembly that couples the handle legs 430 to the lift bar 442. Each of the second connecting bars 438 receives a seesaw fastener 454 between the first connecting bars 434 and the lift bar 442. The seesaw fastener 454 extends through the base 414 and constrains motion of the second connecting bars 438 in a seesaw-like fashion. That is, movement in a direction at one end of the second connecting bar 438 results in movement at the other end of the second connecting bar 438 in an opposite direction.

Figure 21B:
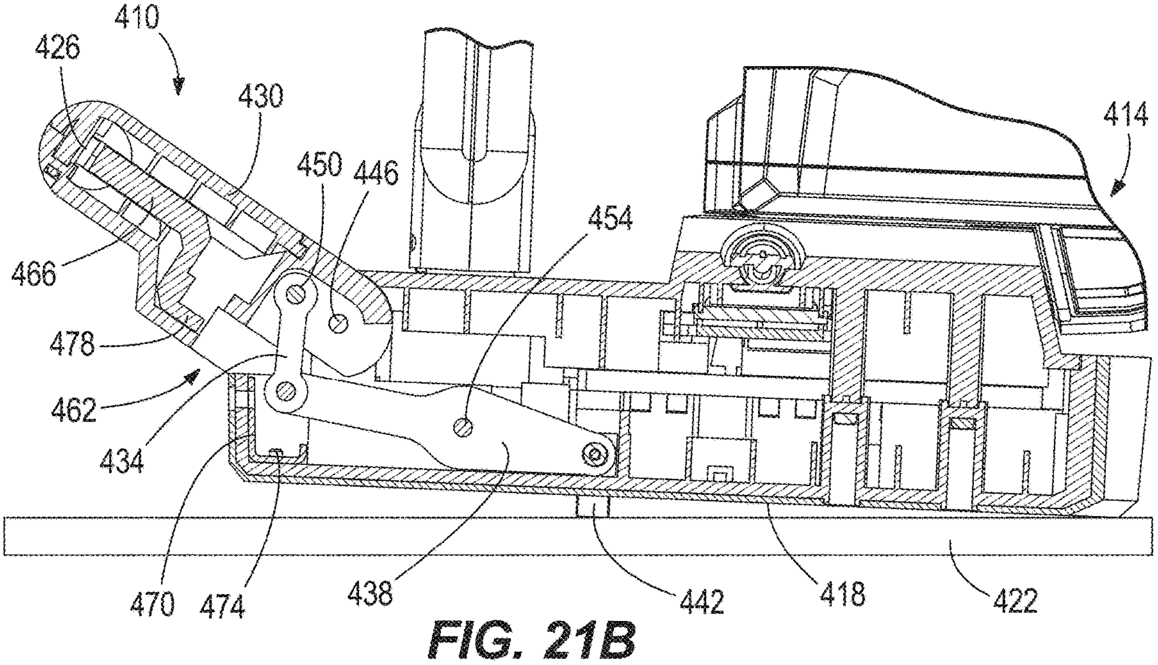
FIG. 21B is a side cross-sectional view of the base with the manual release assist mechanism of FIG. 20A engaged with the work surface.

With reference to FIGS. 21A and 21B, to engage the manual release assist mechanism 410, a user may grasp the handle 426 and pull the handle 426 in a direction away from the work surface 422. As the handle 426 is pulled, the handle legs 430 rotate about the first fastener 446 and pull the second fastener 450, the first connecting bars 434, and an end of each of the second connecting bars 438 in a direction extending away from the work surface 422. Due to the seesaw fastener 454, the movement at the end of each of the second connecting bars 438 in a direction extending away from the work surfaces 422 induces a movement of the lift bar 442 in a direction extending toward the work surface 422. As the lift bar 442 moves toward the work surface 422, the lift bar 442 moves through an aperture 458 (FIG. 18) in the magnetic surface 418 to engage the work surface 422. Therefore, the lift bar 442 may also be referred to as a ground engaging portion. As the lift bar 442 engages the work surface 422, the lift bar 442 applies a force on the work surface 422 to separate at least a portion of the magnetic surface 418 from the work surface 422. As such, the force applied by the lift bar 442 to the work surface 422 alleviates the strength of the magnetic connection between the magnetic surface 418 of the base 414 and the work surface 422. A user may then remove the remaining portion of the magnetic surface 418 from the work surface 422 with a force that is less than the force that would been required to separate the magnetic surface 418 and the work surface 422 in absence of the manual release assist mechanism 410.

In the illustrated embodiment of FIG. 21A and 21B, the manual release assist mechanism 410 additionally includes a locking mechanism 462. The locking mechanism 462 includes an actuator 466, a lock bracket 470, and a fastener 474 that secures the lock bracket 470 to the base 414. The actuator 466 includes an actuator bracket 478 that extends from the handle 426 through the handle legs 430, to engage the lock bracket 470. As such, when the locking mechanism 462 is in a locked state, the lock bracket 470 creates an interference with the actuator bracket 478 that inhibits rotation of the handle legs 430. The locking mechanism 462 may be adjusted to an unlocked state by pulling on the actuator 466 to move the actuator bracket 478 away from the lock bracket 470. As such, pulling the actuator 466 removes the interference between the actuator bracket 478 and the lock bracket 470 and enables a user to rotate the handle legs 430 for engaging the manual release assist mechanism 410. In some embodiments, the manual release assist mechanism 410 may not include the locking mechanism 462.

Figure 22A:
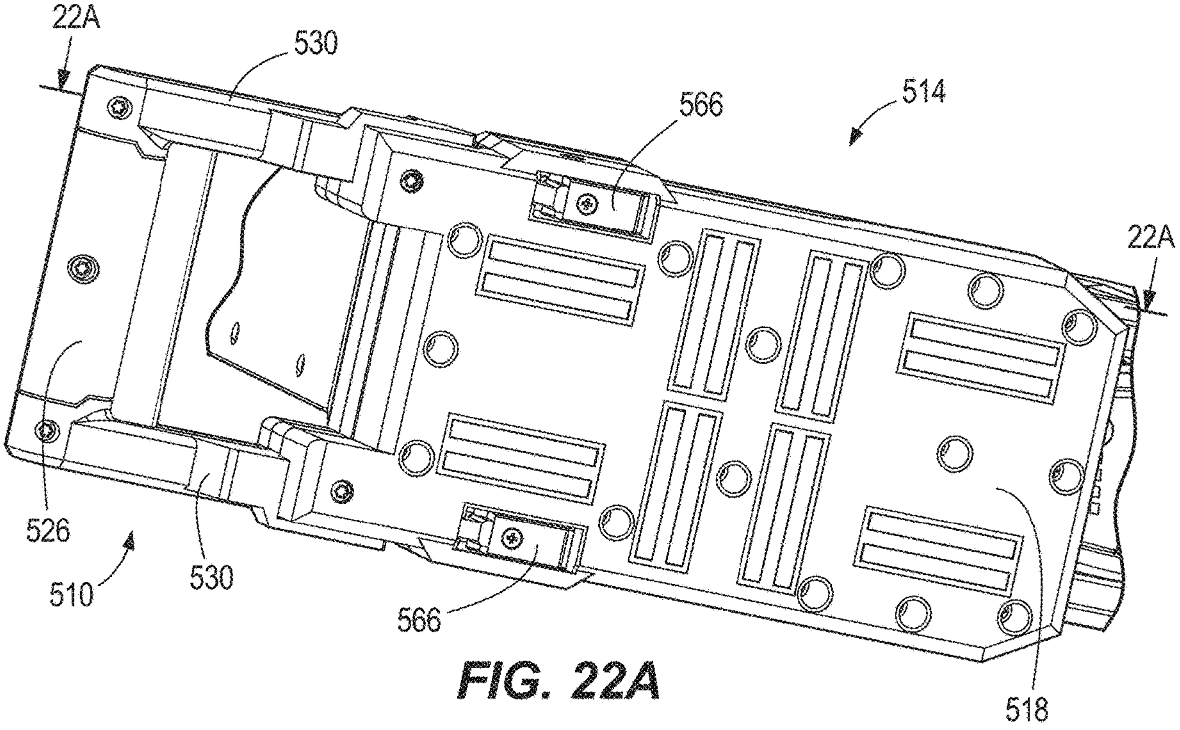
FIG. 22A is a bottom perspective view of a base and a manual release assist mechanism according to another embodiment of the disclosure.
Figure 22B:
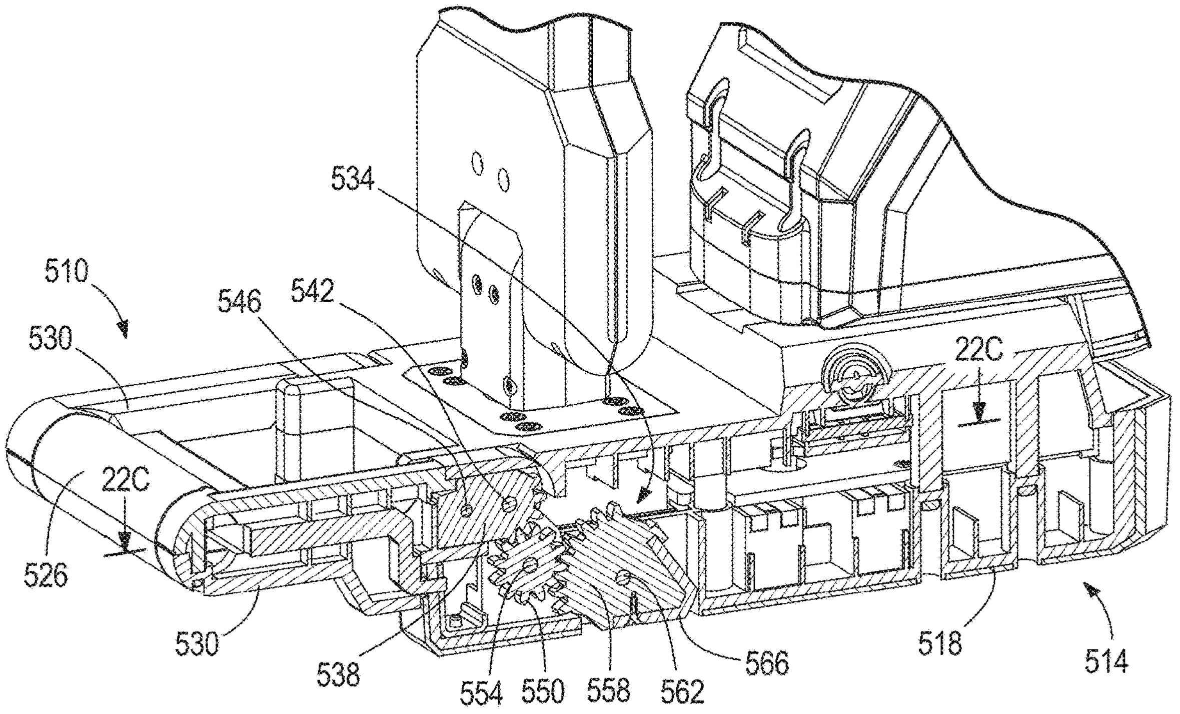
FIG. 22B is a cross-sectional view of the base and the manual release assist mechanism taken along line 22A-22A in FIG. 22A.
Figure 22C:
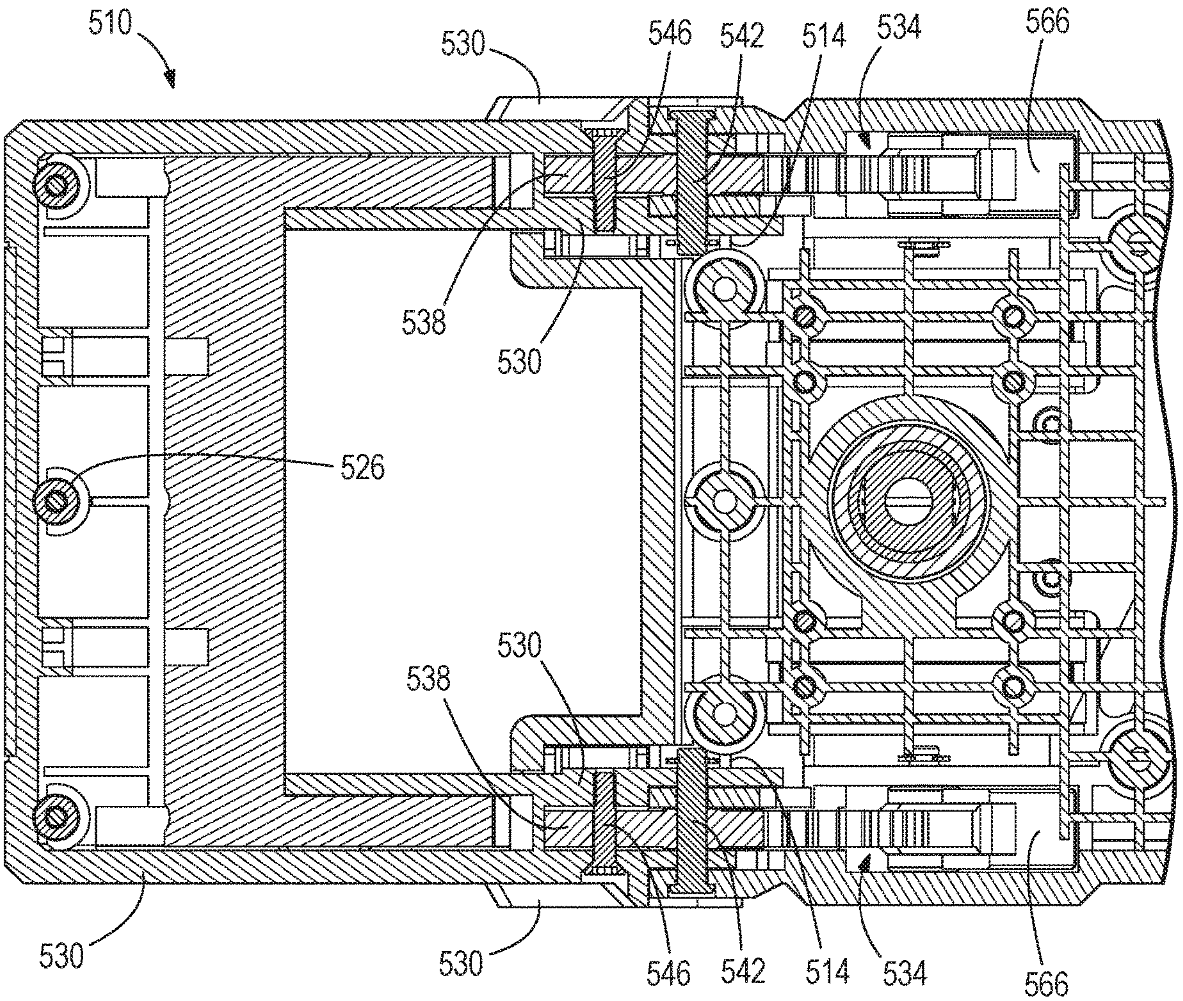
FIG. 22C is a cross-sectional view of the base and the manual release assist mechanism taken along line 22C-22C in FIG. 22B.

FIGS. 22A-22C illustrate another embodiment of a manual release assist mechanism 510 for a base 514 that is substantially similar to the base 14 and includes a magnetic surface 518 configured to be attached to a work surface 522. The manual release assist mechanism 510 includes a handle 526, handle legs 530 extending from each side of the handle 526, and gear assemblies 534. Each of the gear assemblies 534 is provided at an end of a corresponding one of the handle legs 530 opposite from the handle 526. Each of the gear assemblies 534 includes a drive gear 538 mounted to both a first drive gear fastener 542 and a second drive gear fastener 546, an intermediate gear 550 rotatably mounted to an intermediate gear fastener 554, and a driven gear 558 rotatably mounted to a driven gear fastener 562 and having a support stand 566. The gear assemblies 534 may also be referred to as a link assembly that couples the handle legs 530 to the support stand 566. The first drive gear fasteners 542 couple the base 514 with the handle legs 530 and the drive gears 538. The second drive gear fasteners 546 couple each of the drive gears 538 to a corresponding one of the handle legs 530 and do not extend through the base 514. As such, the handle legs 530 and the drive gears 538 are constrained for co-rotation about the first drive gear fastener 542. Each of the drive gears 538 is meshed with and is configured to drive rotation of a corresponding one of the intermediate gears 550. Each of the intermediate gears 550 is also meshed with a corresponding one of the driven gears

558. As such, each of the intermediate gears 550 is configured to drive rotation of the corresponding one of the driven gears 558 as the intermediate gears 550 are driven by the drive gears 538. The support stands 566 are coupled for rotation with the driven gears 558. In the illustrated embodiment of FIGS. 22A-22C, the manual release assist mechanism 510 also includes a locking mechanism 570 that is substantially similar to the locking mechanism 462 described with respect to FIGS. 21A and 21B. In other embodiments, the manual release assist mechanism 510 may not include the locking mechanism 570.

Figure 23A:
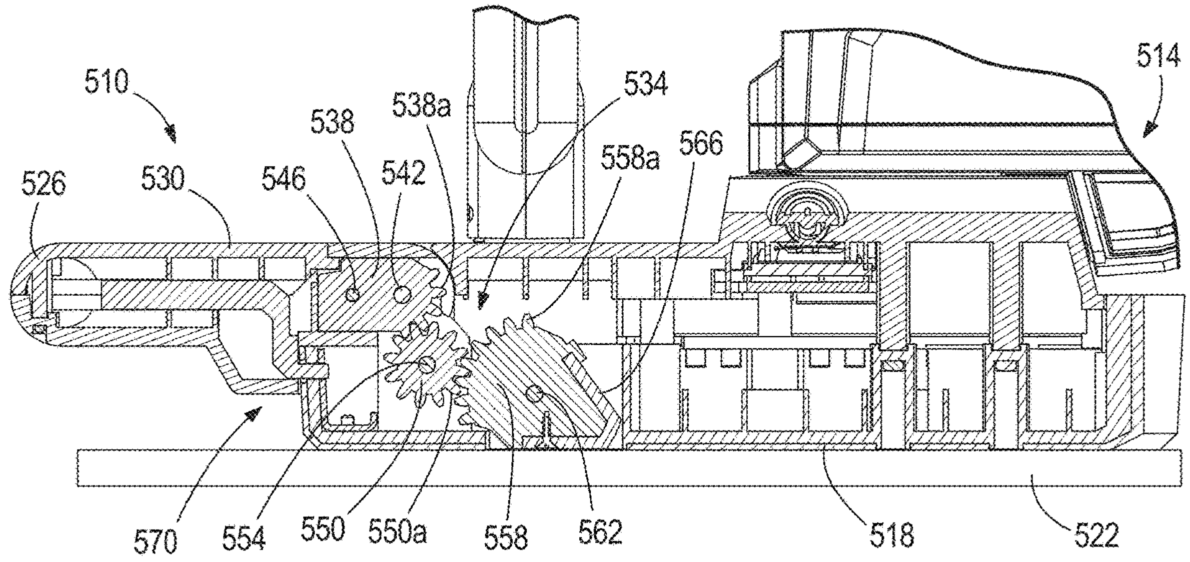
FIG. 23A is a side cross-sectional view of the base with the manual release assist mechanism of FIG. 22A disengaged from a work surface.
Figure 23B:
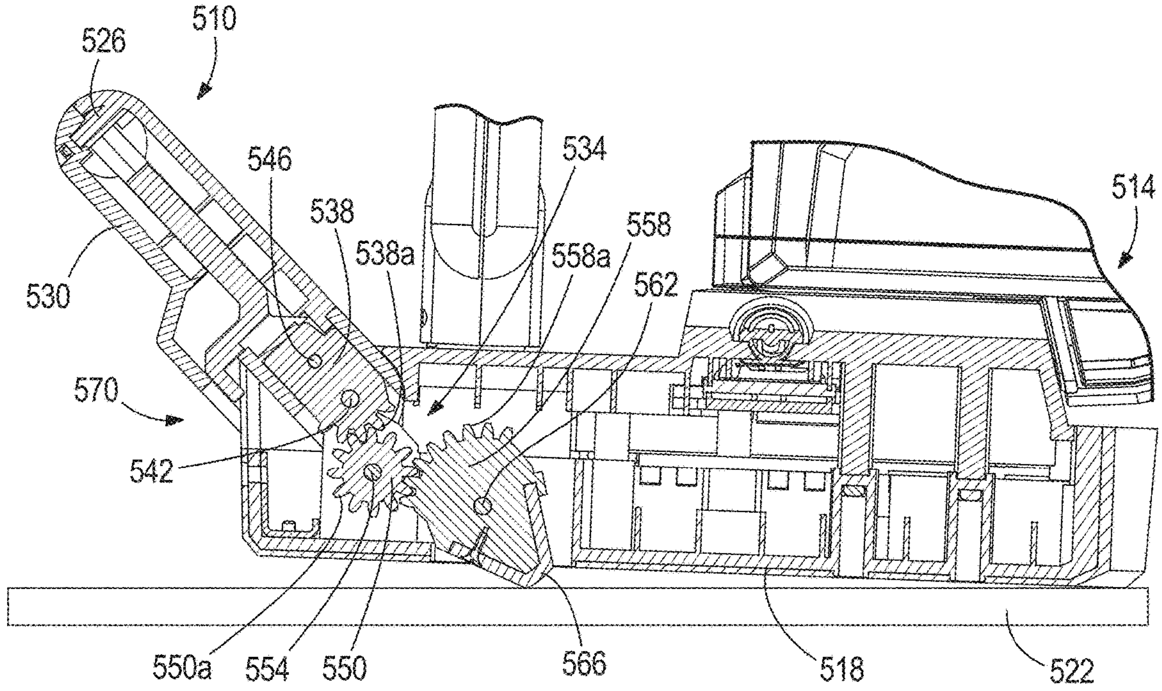
FIG. 23B is a side cross-sectional view of the base with the manual release assist mechanism of FIG. 22A engaged with the work surface.

With reference to FIGS. 23A and 23B, to engage the manual release assist mechanism 510, a user may grasp the handle 526 and pull the handle 526 in a direction away from the work surface 522. As the handle 526 is pulled, each of the handle legs 530 rotates about a corresponding first drive gear fastener 542 such that the drive gears 538 rotate with the handle 526. As the drive gears 538 rotate, teeth 538*a* formed on each of the drive gears 538 mesh with teeth 550*a* formed on a corresponding one of the intermediate gears 550 and cause the intermediate gears 550 to rotate in an opposite direction from the drive gears 538. As the intermediate gears 550 rotate in the opposite direction, the teeth 550*a* of each of the intermediate gears 550 also mesh with teeth 558*a* of a corresponding one of the driven gears 558 and cause the driven gears 558 to rotate in the same direction as the drive gears 538. As the driven gears 558 in the same direction as the drive gears 538 as a result of pulling the handle 526 in a direction away from the work surface 522, the support stand 566 of each gear assembly 534 rotates toward the work surface 522 and into engagement with the work surface 522. Therefore, the support stand 566 may also be referred to as a ground engaging portion. As the support stands 566 of each gear assembly 534 engages the work surface 522, the support stands 566 apply a force on the work surface 522 to separate at least a portion of the magnetic surface 518 from the work surface 522. As such, the force applied by the support stands 566 to the work surface 522 alleviates the strength of the magnetic connection between the magnetic surface 518 of the base 514 and the work surface 522. A user may then remove the remaining portion of the magnetic surface 518 from the work surface 522 with a force that is less than the force that would have been required to separate the magnetic surface 518 and the work surface 522 in absence of the manual release assist mechanism 510.

Figure 24:
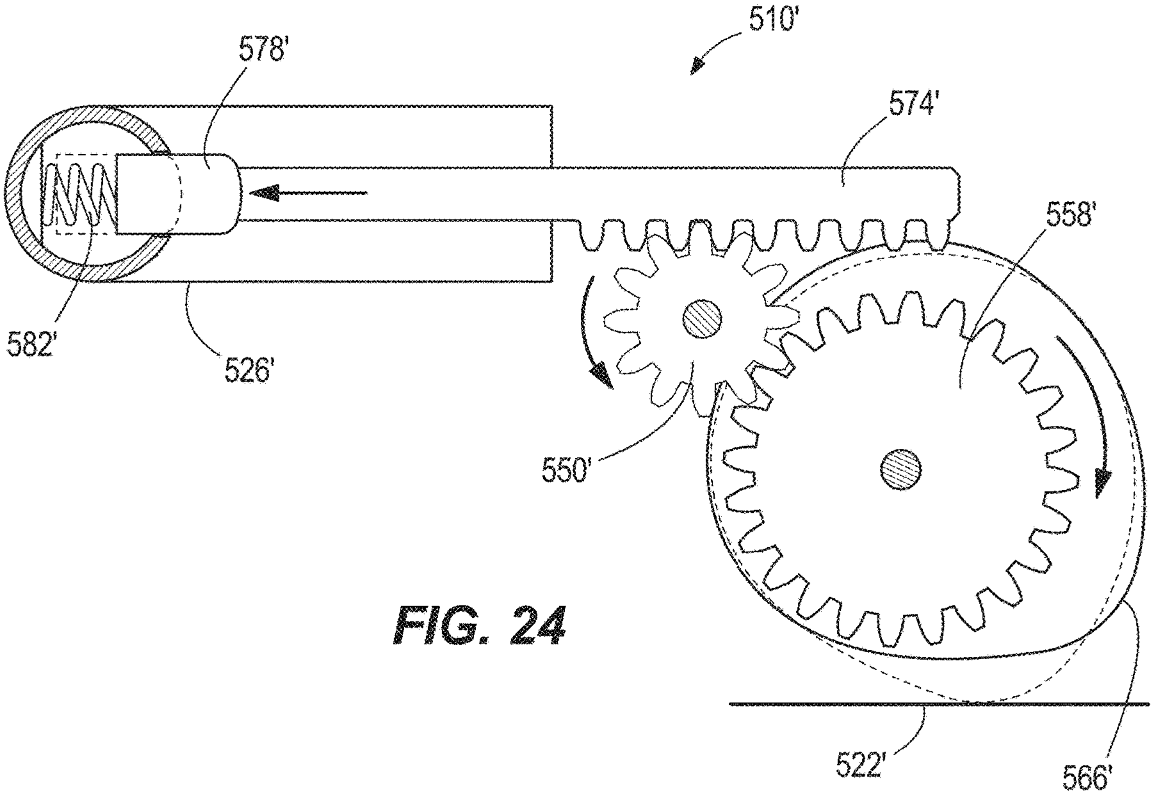
FIG. 24 is a schematic view of a manual release assist mechanism according to another embodiment of the disclosure.

With reference to FIG. 24, in another embodiment of the manual release assist mechanism 510' that is substantially similar to the manual release assist mechanism 510 of FIGS. 22A-22C, the manual release assist mechanism 510' includes a sliding, or translating, rack 574' rather than the drive gear 538 (FIG. 22B). Specifically, the manual release assist mechanism 510' includes a handle 526', an actuator 578' biased by an actuator spring 582', the rack 574', an intermediate gear 550', a driven gear 558', and a support stand 566' mounted to the driven gear 558' for rotation with the driven gear 558'. Although only one rack 574', one intermediate gear 550', one driven gear 558', and one support stand 566' is illustrated, it is understood that the manual release assist mechanism 510' may include two of each of the rack 574', the intermediate gear 550', the driven gear 558', and the support stand 566' (e.g., one on each side of the handle 526'). To engage the manual release assist mechanism 510', a user may pull the actuator 578' against the bias of the actuator spring 582', thereby sliding the rack 574' along the pulling direction. As the rack 574' slides, the rack 574' engages and drives rotation of intermediate gear 550' which then drives the driven gear 558' and the support stand 566' substantially similarly to the manual release assist mechanism 510 of FIGS. 23A and 23B. As such, the support stand 566' may then engage a work surface 522' to alleviate or reduce the strength of a magnetic connection with the work surface 522'.

Figure 25:
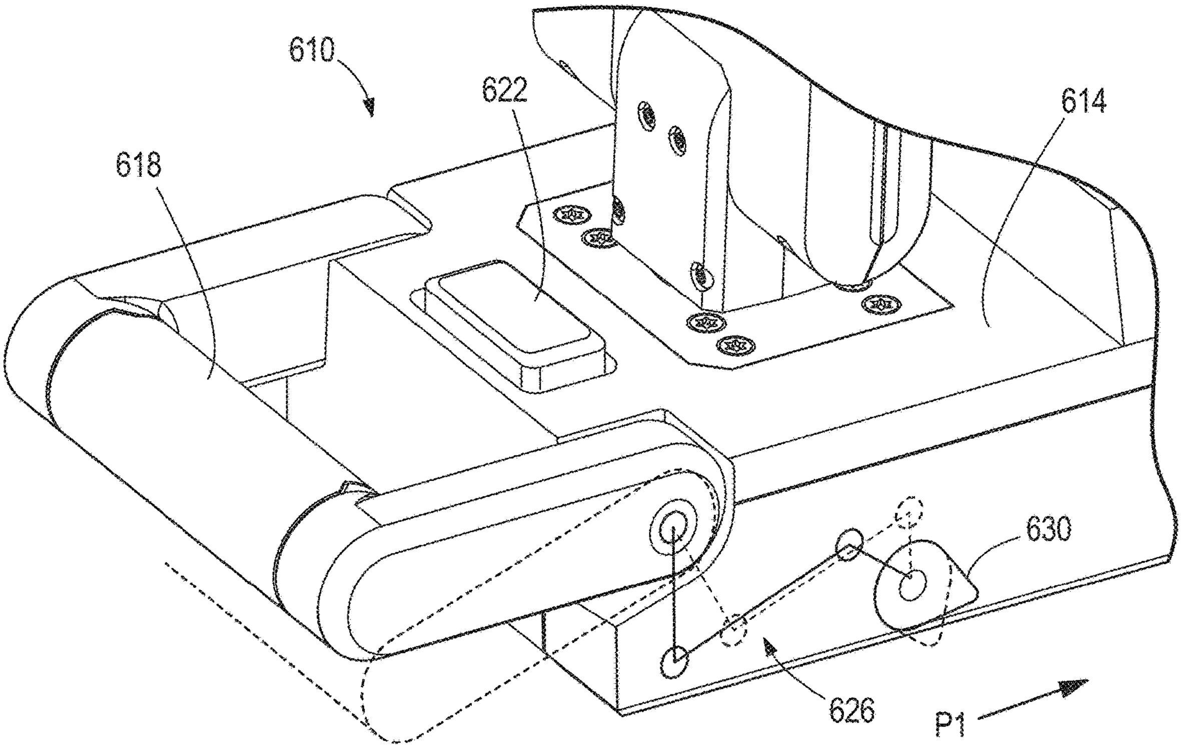
FIG. 25 is a schematic view of a base and a manual release assist mechanism according to another embodiment of the disclosure.

FIG. 25 illustrates another embodiment of a manual release assist mechanism 610 for alleviating or reducing the strength of a magnetic connection between a base 614 and a work surface, such as the work surface 5 of FIG. 1. The magnetic release assist mechanism 610 includes a handle 618, a push button 622, a linkage assembly 626, and a support stand 630. The handle 618 is rotatably mounted to the base 614. The linkage assembly 626 effectively couples the handle 618 with the support stand 630. The linkage assembly 626 may be substantially similar to the first connecting bar 434 and the second connecting bar 438 of FIGS. 20A and 20B. The support stand 630 is configured to engage a work surface. To engage the manual release assist mechanism 610, a user may push the handle 618 toward the work surface, thereby moving the linkage assembly 626 in a forward direction P1. As the linkage assembly 626 moves in the forward direction P1, the linkage assembly 626 induces rotation of the support stand 630 toward the work surface so that the support stand 630 engages the work surface to alleviate the strength of the magnetic connection between base 614 and the work surface. To disengage the manual release assist mechanism 610 from the work surface, a user may push down on the push button 622 and then rotate the handle 618 away from the work surface such that the linkage assembly 626 induces rotation of the support stand 630 away from the work surface.

Figure 26:
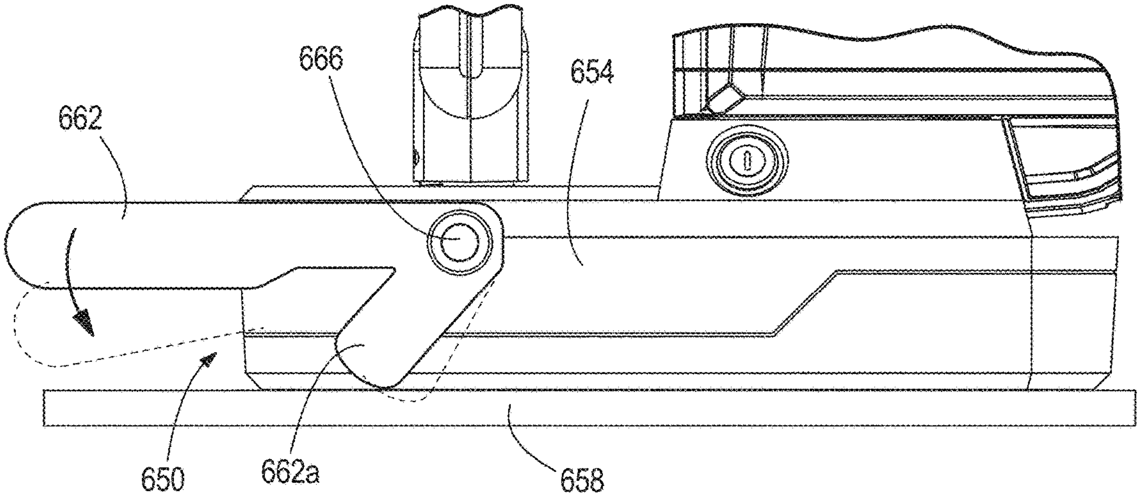
FIG. 26 is a schematic view of a base and a manual release assist mechanism according to another embodiment of the disclosure.

FIG. 26 illustrates another embodiment of a manual release assist mechanism 650 for alleviating or reducing the strength of a magnetic connection between a base 654 and a work surface 658. The manual release assist mechanism 650 includes a handle 662 configured to rotate relative to the base 654. The handle 662 extends through the base 654 and is rigidly formed with a wedge end 662*a*. To engage the manual release assist mechanism 650, a user may push the handle 662 in a direction towards the work surface 658. As the handle 662 moves toward the work surface 658, the wedge end 662*a* of the handle 662 rotates toward the work surface 658 about a pivot pin 666. As such, the wedge end 662*a* may engage the work surface 658 to apply a force on the work surface 658 and alleviate, or reduce, the strength of the magnetic connection between the base 654 and the work surface 658. In some embodiments, the manual release assist mechanism 650 may include a locking mechanism at the pivot pin 666 for holding, or locking, the wedge end 662*a* in engagement with the work surface 658.

Figure 27:
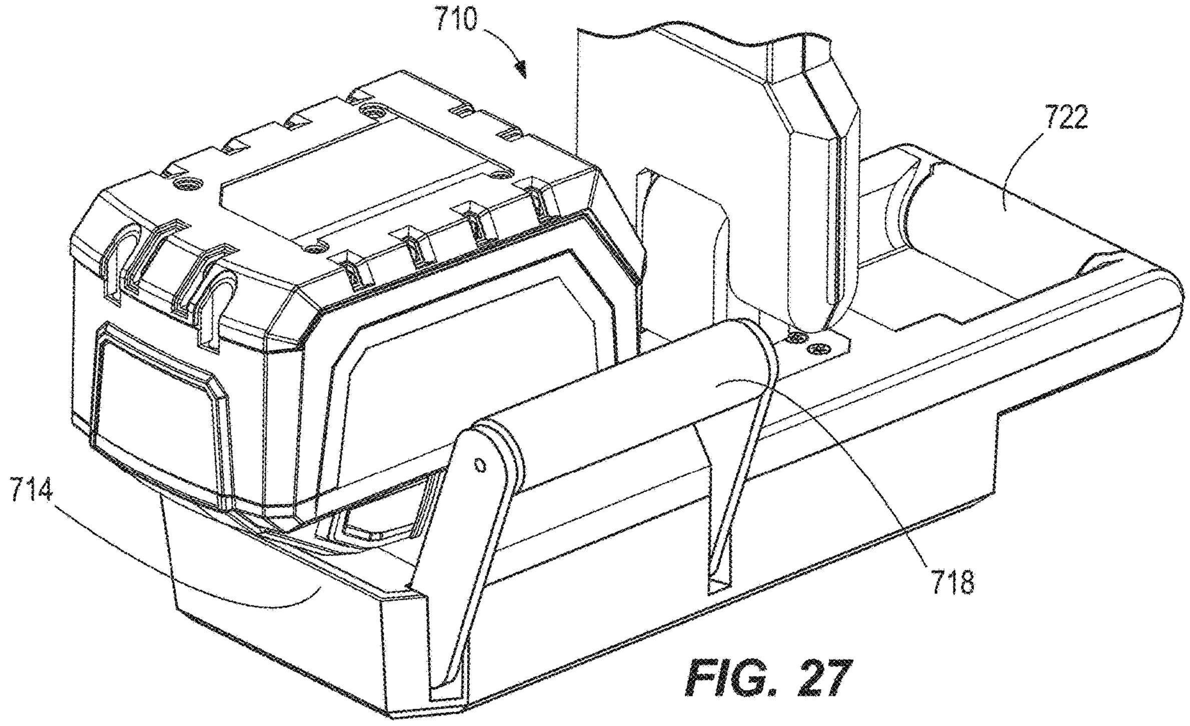
FIG. 27 is a schematic view of a base and a manual release assist mechanism according to another embodiment of the disclosure.

FIG. 27 illustrates another embodiment of a manual release assist mechanism 710 for alleviating or reducing the strength of a magnetic connection between a base 714 and a work surface. The manual release assist mechanism 710 includes a first handle 718 and a second handle 722. The first handle 718 may be provided with, or configured with, components similar to any of the previously described manual release assist mechanisms 26, 250, 310, 410, 510 for engaging a work surface to reduce the strength of the magnetic connection between the base 714 and the work surface. The second handle 722 is disposed at an end of the base 714 and may be grasped by a user to assist with movement of the base 714 once the first handle 718 has been rotated to reduce the strength of the magnetic connection between the base 714 and the work surface.

Figure 28:
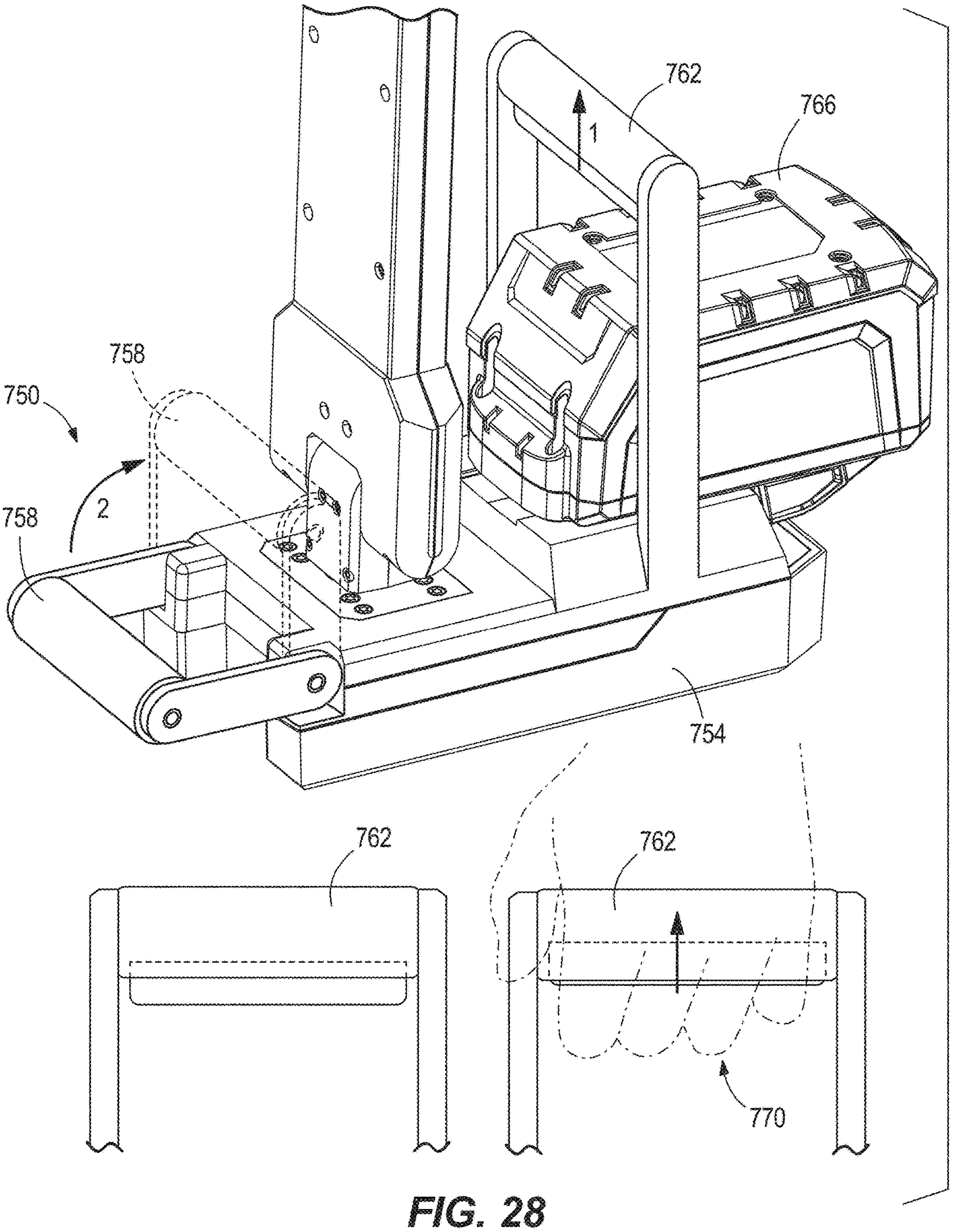
FIG. 28 is a schematic view of a base and a manual release assist mechanism according to another embodiment of the disclosure.

FIG. 28 illustrates another embodiment of a manual release assist mechanism 750 for alleviating or reducing the strength of a magnetic connection between a base 754 and a work surface. The manual release assist mechanism 750 includes a first handle 758 and a second handle 762. The first handle 758 may be provided with, or configured with, components similar to any of the previously described manual release assist mechanisms 26, 250, 310, 410, 510 for engaging a work surface to reduce the strength of the magnetic connection between the base 754 and the work surface. The second handle 762 is provided at and extends over a battery 766. The second handle 762 includes a locking mechanism 770 for locking, or inhibiting, motion of the first handle 758. The locking mechanism 770 may be substantially similar to the locking mechanism 462. As such, to engage the manual release assist mechanism 750, a user must first pull the locking mechanism 770 on the second handle 762 to unlock the first handle 758. A user may then rotate the first handle 758 in a direction away from a work surface to engage the manual release assist mechanism 750 with the work surface similarly to any of the manual release assist mechanisms 26, 250, 310, 410, 510 as described above.

Figure 29:
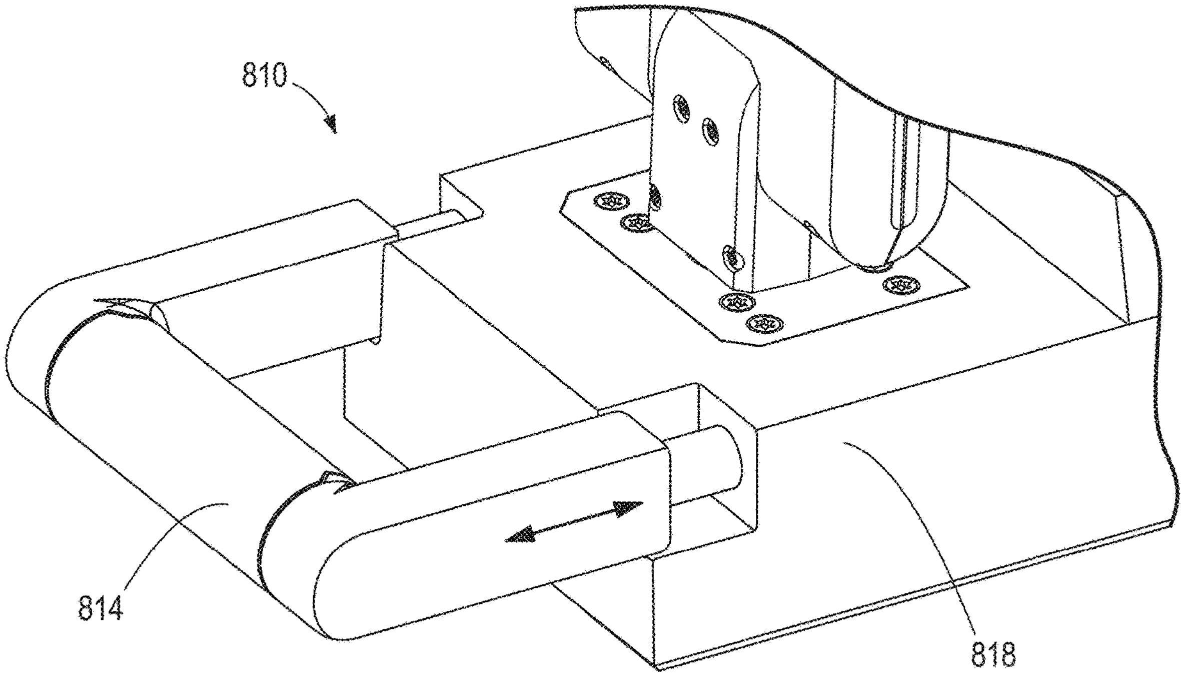
FIG. 29 is a schematic view of a locking mechanism for any of the manual release assist mechanisms described herein.

FIG. 29 illustrates another embodiment of a locking mechanism 810. The locking mechanism 810 may be implemented with any of the manual release assist mechanisms 26, 250, 310, 410, 510, 610, 650, 710, 750 described herein. The locking mechanism 810 is formed integrally with a handle 814 and a base 818. Specifically, to unlock the locking mechanism 810, a user may pull the handle 814 itself in a direction away from the base 818, rather than pulling on an actuator provided in and/or on the handle 814. Pulling the handle 814 away from the base 818 may, for example, pull an actuator bracket (e.g., actuator bracket 478 in FIG. 21A) out of engagement with a lock bracket (e.g., lock bracket 470 in FIG. 21A). As such, in an unlocked position, the handle 814 is extended from the base 818. To lock, or re-lock, the locking mechanism 810, a user may push the handle 814 back toward the base.

Although the invention has been described in detail with reference to certain preferred embodiments, variations and modifications exist within the scope and spirit of one or more independent aspects of the invention as described. Various features and advantages are set forth in the following claims.

The invention claimed is:

1. A work light comprising:

a base configured to receive a battery;

an arm including a first arm segment attached to the base and a second arm segment attached to the first arm segment, the arm adjustable between a collapsed state and an extended state;

an arm hinge disposed between the first arm segment and the second arm segment at an end of the first arm segment opposite from the base, the arm hinge including a first head joint coupled to the first arm segment, a second head joint coupled to the second arm segment, and a center joint located between the first and second head joints, each of the first head joint, the second head joint, and the center joint being hollow, the arm hinge enabling the second arm segment to pivot relative to the first arm segment between the collapsed state and the extended state; and a light fixture attached to an end of the second arm segment opposite the first arm segment, the light fixture connected to the battery by wiring that extends from the base to the light fixture through the arm hinge.

2. The work light of claim 1, wherein the center joint defines a first arm hinge axis, the first head joint defines a second arm hinge axis, and the second head joint defines a third arm hinge axis, and wherein the second arm segment is pivotable relative to the first arm segment about the first arm hinge axis, the second arm hinge axis, and the third arm hinge axis.

3. The work light of claim 2, wherein the first arm hinge axis is perpendicular to the second arm hinge axis.

4. The work light of claim 3, wherein the first arm hinge axis is also perpendicular to the third arm hinge axis.

5. The work light of claim 1, wherein the arm hinge also includes a hinge casing that covers the center joint.

6. The work light of claim 5, wherein the hinge casing is divided into two hinge casing halves that are rotatable relative to one another.

7. The work light of claim 1, wherein the center joint includes two U-shaped brackets for coupling the center joint to the first head joint and the second head joint.

8. The work light of claim 1, wherein the first head joint includes two head joints that are coaxial and oriented along a shared head joint axis, and wherein the second head joint includes two head joints that are coaxial and oriented along a shared head joint axis.

9. The work light of claim 1, wherein the center joint includes an integrated hard stop to inhibit over rotation of the arm hinge.

10. A work light comprising:

a base configured to receive a battery;

an arm attached to the base and configured to pivot relative to the base;

a base hinge disposed between the base and the arm, the base hinge including a center shaft extending from the base and a head joint positioned at an end of the center shaft opposite from the base, the center shaft and the head joint being hollow; and a light fixture attached to an end of the arm opposite the base, the light fixture connected to the battery by wiring that extends from the base to the light fixture through the base hinge.

11. The work light of claim 10, wherein the center shaft defines a first base hinge axis, wherein the head joint defines a second base hinge axis, and wherein the arm is rotatable relative to the base about the first base hinge axis and the second base hinge axis.

12. The work light of claim 11, wherein the first base hinge axis is perpendicular to the second base hinge axis.

13. The work light of claim 10, wherein the base hinge also includes a plate portion that is secured to the base, and wherein the center shaft extends from the plate portion.

14. The work light of claim 10, wherein the head joint includes two head joints.

15. The work light of claim 10, wherein the center shaft includes an integrated hard stop to inhibit over rotation of the base hinge.

16. A work light comprising:

a base configured to receive a battery;

an arm attached to the base and configured to pivot relative to the base;

a light fixture attached to an end of the arm opposite the base, the light fixture adjustable relative to the arm between an extended state and a transport state; and a light fixture hinge disposed between the arm and the light fixture, the light fixture hinge including a first head joint coupled to the arm, a second head joint coupled to the light fixture, and a center joint located between the first and second head joints, each of the first head joint, the second head joint, and the center joint being hollow, the light fixture hinge enabling the light fixture to pivot relative to the arm between the extended state and the transport state, wherein the light fixture is connected to the battery by wiring that extends from the base to the light fixture through the light fixture hinge.

17. The work light of claim 16, wherein the center joint defines a first light fixture axis, the first head joint defines a second light fixture axis, and the second head joint defines a third light fixture axis, and wherein the light fixture is pivotable relative to the arm about the first axis, the second axis, and the third axis.

18. The work light of claim 17, wherein the first light fixture axis is perpendicular to the second light fixture axis and the third light fixture axis.

19. The work light of claim 16, wherein the first head joint includes two head joints that are coaxial and oriented along a shared head joint axis, and wherein the second head joint includes two head joints that are coaxial and oriented along a shared head joint axis.

20. The work light of claim 16, wherein the center joint includes an integrated hard stop to inhibit over rotation of the light fixture hinge.

* * * * *